(12) United States Patent
Kim et al.

(10) Patent No.: US 11,934,229 B2
(45) Date of Patent: Mar. 19, 2024

(54) OPTICAL SENSOR AND ELECTRONIC DEVICE COMPRISING SAME

(71) Applicant: SAMSUNG ELECTRONICS CO., LTD., Suwon-si (KR)

(72) Inventors: Jongah Kim, Suwon-si (KR); Heewoong Yoon, Suwon-si (KR); Kihyuk Lee, Suwon-si (KR); Donghan Lee, Suwon-si (KR); Jeongho Cho, Suwon-si (KR); Gwangho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/113,938

(22) Filed: Feb. 24, 2023

(65) Prior Publication Data

US 2023/0213977 A1   Jul. 6, 2023

Related U.S. Application Data

(63) Continuation of application No. PCT/KR2021/011372, filed on Aug. 25, 2021.

(30) Foreign Application Priority Data

Aug. 26, 2020 (KR) .................. 10-2020-0107923

(51) Int. Cl.
*G06F 1/16* (2006.01)
*G06F 1/3231* (2019.01)
(Continued)

(52) U.S. Cl.
CPC .......... *G06F 1/1652* (2013.01); *G06F 1/1694* (2013.01); *G06F 1/3231* (2013.01);
(Continued)

(58) Field of Classification Search
CPC .... G06F 1/1652; G06F 1/1694; G06F 1/3231; G06F 1/3265; H04M 1/724631; H04M 1/0239; H04M 1/0268
See application file for complete search history.

(56) References Cited

U.S. PATENT DOCUMENTS 8,779,361 B2   4/2014   Costello et al.
8,791,489 B2   7/2014   Rudmann et al.
(Continued)

FOREIGN PATENT DOCUMENTS

CN   102522049   10/2013
CN   108333639   7/2018
(Continued)

OTHER PUBLICATIONS

International Search Report for PCT/KR2021/011372, dated Dec. 15, 2021, 5 pages.
(Continued)

*Primary Examiner* — Matthew A Eason
*Assistant Examiner* — Sujit Shah
(74) *Attorney, Agent, or Firm* — Nixon & Vanderhye, P.C.

(57) ABSTRACT

According to the present disclosure an electronic device is disclosed comprising: a housing including a front surface, a rear surface facing the direction opposite to the front surface, and a side surface encompassing the space between the front surface and the rear surface; a display included in the housing and visible to the outside of the electronic device through the front surface; an optical sensor positioned between the display and the rear surface overlapping at least one region of the display when viewed from above the front surface, and including a light-emitting part and a light-receiving part; and a first partition positioned between the light-emitting part and the light-receiving part based on the
(Continued)

electronic device having a first shape, and a second partition present between the light-emitting part and the light-receiving part based on the electronic device having a second shape transformed from the first shape, wherein a straight line connecting the light-emitting part and the light-receiving part is perpendicular to the direction in which the electronic device changes from the first shape to the second shape.

20 Claims, 24 Drawing Sheets

(51) Int. Cl.
    *G06F 1/3234*     (2019.01)
    *H04M 1/02*     (2006.01)
    *H04M 1/72463*     (2021.01)

(52) U.S. Cl.
    CPC ........ *G06F 1/3265* (2013.01); *H04M 1/0239* (2013.01); *H04M 1/0268* (2013.01); *H04M 1/724631* (2022.02)

(56) References Cited

U.S. PATENT DOCUMENTS

| | | | |
|---|---|---|---|
| 9,733,357 | B2 | 8/2017 | Costello et al. |
| 10,209,742 | B2 | 2/2019 | Shin |
| 2015/0049062 | A1 | 2/2015 | Kim et al. |
| 2015/0331106 | A1 | 11/2015 | Okada |
| 2017/0122863 | A1 | 5/2017 | Tan et al. |
| 2018/0032106 | A1 | 2/2018 | Yu et al. |
| 2018/0045827 | A1 | 2/2018 | Yoon et al. |
| 2018/0102072 | A1* | 4/2018 | Lee ................... G02F 1/133305 |
| 2018/0217679 | A1 | 8/2018 | Kwon et al. |
| 2019/0090806 | A1 | 3/2019 | Clavelle et al. |
| 2019/0305237 | A1 | 10/2019 | Shin et al. |
| 2019/0327350 | A1 | 10/2019 | Li |
| 2019/0379781 | A1* | 12/2019 | Ma ....................... G09G 3/3406 |
| 2020/0056771 | A1 | 2/2020 | Cho et al. |
| 2021/0019015 | A1 | 1/2021 | Yoon et al. |

FOREIGN PATENT DOCUMENTS

| | | |
|---|---|---|
| JP | 2017-142596 | 8/2017 |
| KR | 10-2014-0139515 | 12/2014 |
| KR | 10-2016-0106237 | 9/2016 |
| KR | 10-2019-0113128 | 10/2019 |
| KR | 10-2020-0019406 | 2/2020 |
| KR | 10-2021-0009873 | 1/2021 |

OTHER PUBLICATIONS

Written Opinion of the ISA for PCT/KR2021/011372, dated Dec. 15, 2021, 3 pages.

* cited by examiner

OPTICAL SENSOR AND ELECTRONIC DEVICE COMPRISING SAME

CROSS-REFERENCE TO RELATED APPLICATIONS

This application is a continuation of International Application No. PCT/KR2021/011372 designating the United States, filed on Aug. 25, 2021, in the Korean Intellectual Property Receiving Office and claiming priority to Korean Patent Application No. 10-2020-0107923, filed on Aug. 26, 2020, in the Korean Intellectual Property Office, the disclosures of which are incorporated by reference herein in their entireties.

BACKGROUND

Field

The disclosure relates to an optical sensor and an electronic device including the same. For example, the disclosure relates to a rollable display device including an optical sensor and a method for controlling the same.

Description of Related Art

An optical sensor is a type of an element capable of detecting information by converting information included in light into an electrical signal and includes a light emitter and a light receiver to acquire information about an object.

The optical sensor may determine information of an object, such as the shape and motion of the object, by measuring the amount of light generated by the light emitter, reflected by the object, and returned to the light receiver.

When applied to a mobile device, such an optical sensor may be used to determine information such as whether a user exists in a location adjacent to the mobile device or whether the user's body is approaching the mobile device.

Recently, a method of mounting an optical sensor in a rollable device (a rollable display device) or a foldable device capable of simultaneously providing a wide screen and portability has been proposed.

In the case of mounting an optical sensor in a rollable device and there is a structure for isolating a light emitter and a light receiver only before the display is extended, when the display is extended, crosstalk may increase since there is no structure for isolating the light emitter and the light receiver.

In addition, when interference occurs between the optical sensor and the isolation structure while the display is moving, the structure for isolating the light emitter and the light receiver of the optical sensor may be deviated or crushed, so the light emitter and the light receiver may not be properly isolated from each other. Similarly, physical pressure may be applied to the optical sensor and/or the display and damage may occur due to the push of the isolation structure and the optical sensor while the display is moving.

SUMMARY

Embodiments of the disclosure provide a rollable device capable of preventing and/or reducing deterioration of the performance of an optical sensor by reducing crosstalk caused by diffuse reflection by considering both the structures before and after the display is extended while arranging the optical sensor in the rollable device.

The technical problems to be addressed by the disclosure are not limited to those described above, and other technical problems, which are not described above, may be clearly understood by a person ordinarily skilled in the related art to which this disclosure belongs.

An electronic device according to an example embodiment may include: a housing including a front surface, a rear surface facing away from the front surface, and a side surface surrounding a space between the front surface and the rear surface, a display included in the housing and visible to the outside of the electronic device through the front surface, an optical sensor located between the display and the rear surface and overlapping at least one area of the display when viewed from above the front surface, the optical sensor including a light emitter and a light receiver, a first partition located between the light emitter and the light receiver based on the electronic device having a first shape, and a second partition present between the light emitter and the light receiver based on the electronic device having a second shape transformed from the first shape. A straight line interconnecting the light emitter and the light receiver may be perpendicular to a direction in which the electronic device is transformed from the first shape to the second shape.

An electronic device according to an example embodiment may include: a first housing, a second housing coupled to the first housing and configured to be movable with respect to the first housing, a flexible display seated in the first housing and configured to be retracted into an inner space defined by the first housing and the second housing at a first edge of the first housing, wherein the flexible display includes glass defining the front surface of the electronic device, a pixel layer disposed under the glass and including a plurality of pixels, and a cover layer disposed under the pixel layer, a circuit board disposed under the flexible display, an optical sensor disposed between the circuit board and the flexible display and including a light emitter and a light receiver, at least one partition disposed between the optical sensor and the cover layer. Based on the flexible display having a first length in a direction perpendicular to the first edge, the optical sensor may be disposed to correspond to a first position of the flexible display, and based on the second housing moving with respect to the first housing and the flexible display having a second length greater than the first length in a direction perpendicular to the first edge, the optical sensor may be disposed to correspond to a second position of the flexible display. Based on the optical sensor being at the first position and based on the optical sensor being at the second position, the at least one partition may be disposed between the light emitter and the light receiver.

According to various example embodiments, the shape of a mechanical structure (e.g., sponge, tape, or the like) configured to isolate a light emitter and a light receiver is changed such that the display does not interfere with the mechanical structure even when moving. Thus, even in a rollable device, it is possible to improve optical sensor performance by clearly distinguishing signals caused by an external object by reducing crosstalk of the optical sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar components may be denoted by the same or similar reference numerals.

DETAILED DESCRIPTION

Figure 1A:
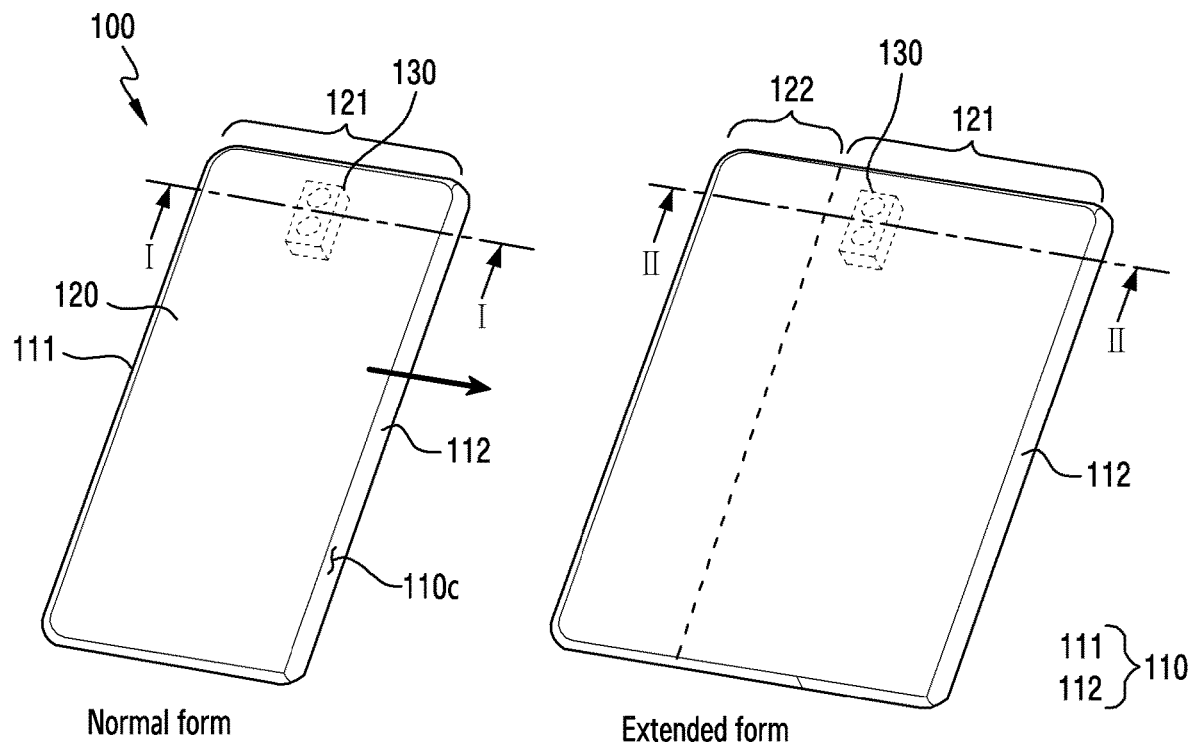
FIG. 1A is a perspective view of a rollable device extending in a first direction according to various embodiments.

FIG. 1A is a perspective view of an electronic device 100 (e.g., a rollable device) extending in a first direction (e.g., horizontally) according to various embodiments.

Referring to FIG. 1A, the display 120 (e.g., the display module 160 of FIG. 15) of the electronic device 100 (e.g., the electronic device 1501 of FIG. 15) may be contracted or extended depending on a change in the state of the housing 110.

In an embodiment, the electronic device 100 may include a contractible and/or extendable housing 110. In an embodiment, the electronic device 100 may include a first housing 111 and a second housing 112 coupled to the first housing 111 to be movable within a predetermined (e.g., specified) range. When the second housing 112 moves in the arrow direction (e.g., a first direction or a horizontal direction) with respect to the first housing 111, the area of the housing 110 may be extended, and when the second housing 112 moves in a direction (e.g., a third direction) opposite to the arrow direction, the area of the housing 110 may be contracted. Depending on the contraction and/or extension of the housing 110, the size of the entire electronic device 100 (e.g., the display) may also be contracted and/or extended.

In an embodiment, the maximum distance between the first housing 111 and the second housing 112 may increase or decrease depending on the movement of the second housing 112 relative to the first housing 111. For example, when the first housing 111 configures the left edge of the electronic device 100 and the second housing 112 configures the right edge, the distance between the left edge and the right edge may vary depending on the extension of the display.

In an embodiment, the electronic device 100 may include a rollable display 120. In an embodiment, the rollable display 120 may include a first portion 121 that is always exposed or visible (as used herein, the term "exposed" and "visible" may be used interchangeably when referencing the display and include an example in which the display is covered by a cover glass or other protective layer) to the outside and a second portion 122 that is selectively exposed (e.g., visible) to the outside. In an embodiment, the second portion 122 of the rollable display 120 may be rolled into or rolled out of the housing 110. When the second portion 122 is rolled out, the second portion 122 may be exposed (e.g., visible) to the outside, and when the second portion 122 is rolled in, the second portion 122 may not be exposed (e.g., visible) to the outside. In various embodiments of the disclosure, the second portion 122 may be referred to as a rolled portion 122. In various embodiments of the disclosure, the rollable display 120 may be referred to as a display 120.

In an embodiment, when the second housing 112 moves in the arrow direction (e.g., the first direction) with respect to the first housing 111, the display 120 may be extended while the rolled portion 122 is exposed (e.g., visible) to the outside. In an embodiment, when the second housing 112 is moved in a direction (e.g., the third direction) opposite to the arrow direction with respect to the first housing 111, the rolled portion 122 may be rolled into the housing 110 and the display 120 may be contracted. In various embodiments of the disclosure, when the housing 110 or the display 120 are contracted and/or extended, it may refer, for example, to the size of the portion visually exposed (e.g., visible) to the outside from the entire area of the housing 110 or the display 120 is contracted and/or extended depending on the movement of the second housing 112 with respect to the first housing 111.

In various embodiments of the disclosure, a state in which the display 120 is maximally contracted and/or extended may be referred to as a contracted state and/or an extended state (or a maximally contracted state and/or a maximally extended state). In addition, a state in which the display 120 is between the maximally extended state and the maximally contracted state may be referred to as an intermediately extended state (or an intermediate state).

According to an embodiment, the electronic device 100 may include an optical sensor 130 (e.g., a proximity sensor or an illuminance sensor). As an example, the optical sensor 130 may be disposed at a position adjacent to the display 120, and as another example, the optical sensor 130 may be disposed in the state of being mounted on the rear surface of the display 120 and integrated into the display 120.

Figure 1B:
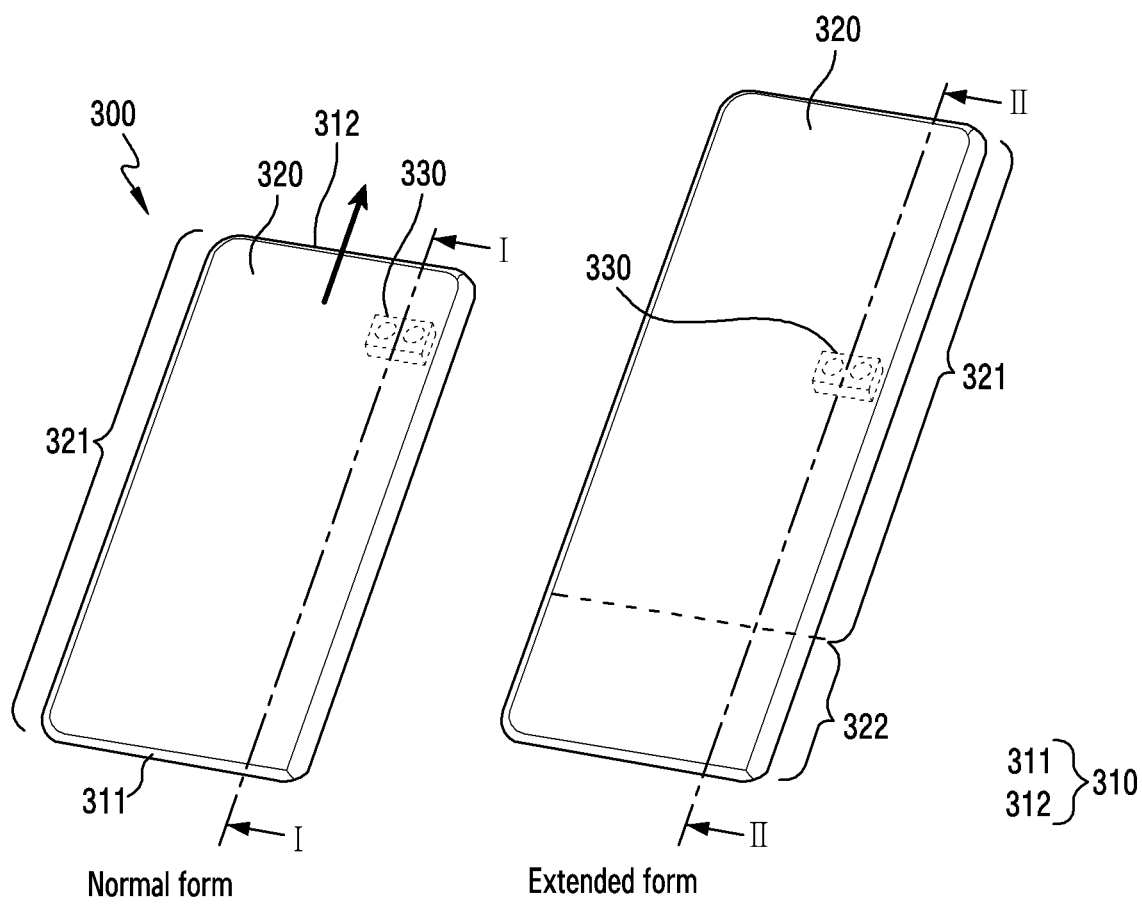
FIG. 1B is a perspective view of a rollable device extending in a second direction according to various embodiments

FIG. 1B is a perspective view of a rollable device extended in a second direction (e.g., vertically) according to various embodiments. At least one of the components of the electronic device of FIG. 1B may be the same as or similar to at least one of the components of the electronic device 100 of FIG. 1A, and an overlapping description thereof may not be repeated.

Referring to FIG. 1B, the display 320 of the electronic device 300 may be contracted or extended depending on a change in the state of the housing 310.

In an embodiment, the electronic device 300 may include a contractible and/or extendable housing 310. In an embodiment, the electronic device 300 may include a first housing 311 and a second housing 312 coupled to the first housing 311 to be movable within a predetermined range. When the second housing 312 moves in the arrow direction (e.g., a second direction) with respect to the first housing 311, the area of the housing 310 may be extended, and when the second housing 112 moves in a direction (e.g., a fourth direction) opposite to the arrow direction, the area of the housing 310 may be contracted. Depending on the contraction and/or extension of the housing 310, the size of the entire electronic device 300 may also be contracted and/or extended.

In an embodiment, the maximum distance between the first housing 311 and the second housing 312 may increase or decrease depending on the movement of the second housing 312 relative to the first housing 311.

In an embodiment, the electronic device 300 may include a rollable display 320. In an embodiment, the rollable display 320 may include a first portion 321 that is always exposed (e.g., visible) to the outside and a second portion 322 that is selectively exposed (e.g., visible) to the outside. In an embodiment, the second portion 322 of the rollable display 320 may be rolled into or rolled out of the housing 310. When rolled out, the second portion 322 may be exposed (e.g., visible) to the outside, and when rolled in, the second portion 322 may not be exposed (e.g., visible) to the outside. In various embodiments of the disclosure, the second portion 322 may be referred to as a rolled portion 322. In various embodiments of the disclosure, the rollable display 320 may be referred to as a display 320.

In an embodiment, when the second housing 312 moves in the arrow direction (e.g., the second direction) with respect to the first housing 311, the display 320 may be extended while the rolled portion 322 is exposed (e.g., visible) to the outside. In an embodiment, when the second housing 312 is moved in a direction (e.g., the fourth direction) opposite to the arrow direction with respect to the first housing 311, the rolled portion 322 may be rolled into the housing 310 and displays 320 may be contracted. In various embodiments of the disclosure, when the housing 310 or the display 320 are contracted and/or extended, it may refer, for example, to the size of the portion visually exposed (e.g., visible) to the outside from the entire area of the housing 310 or the display 320 being contracted and/or extended depending on the movement of the second housing 312 with to the first housing 311.

In various embodiments of the disclosure, a state in which the display 320 is maximally contracted and/or extended may be referred to as a contracted state and/or an extended state (or a maximally contracted state and/or a maximally extended state). In addition, a state in which the display 320 is between the maximally extended state and the maximally contracted state may be referred to as an intermediately extended state (or an intermediate state).

According to an embodiment, the electronic device 300 may include a sensor module 330 (e.g., a proximity sensor or an illuminance sensor). As an example, the sensor module may be disposed adjacent to the display 320, and as another example, the sensor module may be disposed in a state of being mounted on the rear surface of the display 320 and integrated into the display 320. The sensor module 330 (e.g., the sensor module 1576 of FIG. 15) may be understood as equivalent to the optical sensor 130 disclosed herein.

Figure 2A:
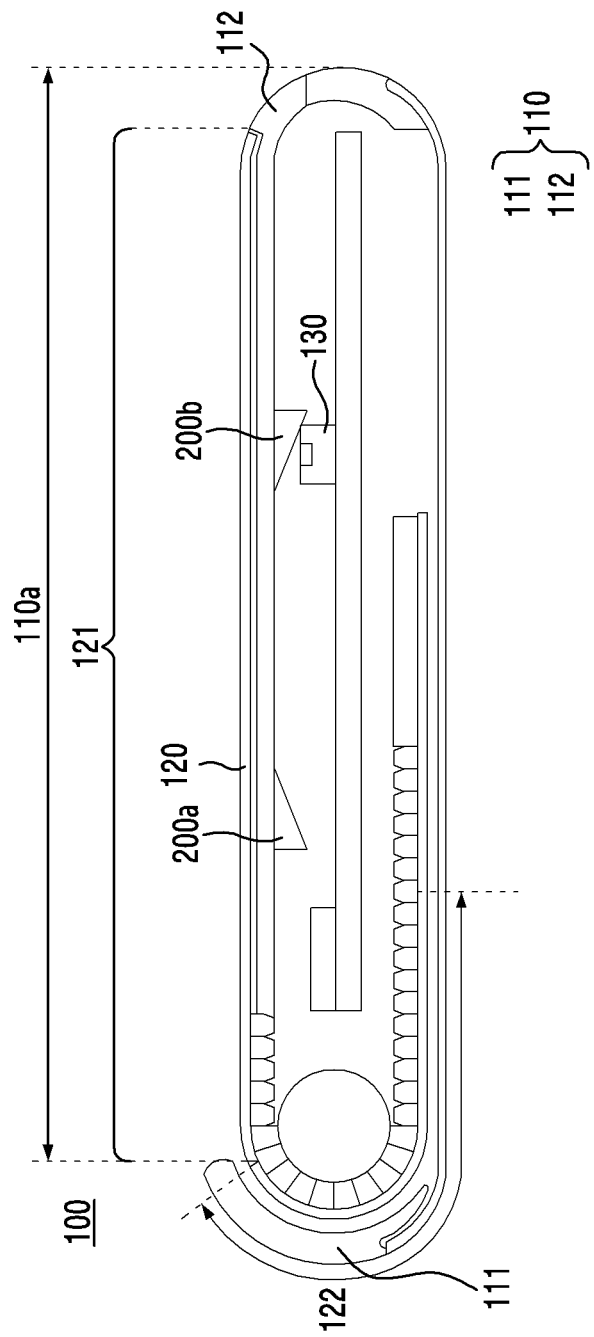
FIG. 2A is a cross-sectional view of an electronic device taken along line I-I in a first state according to various embodiments
Figure 2B:
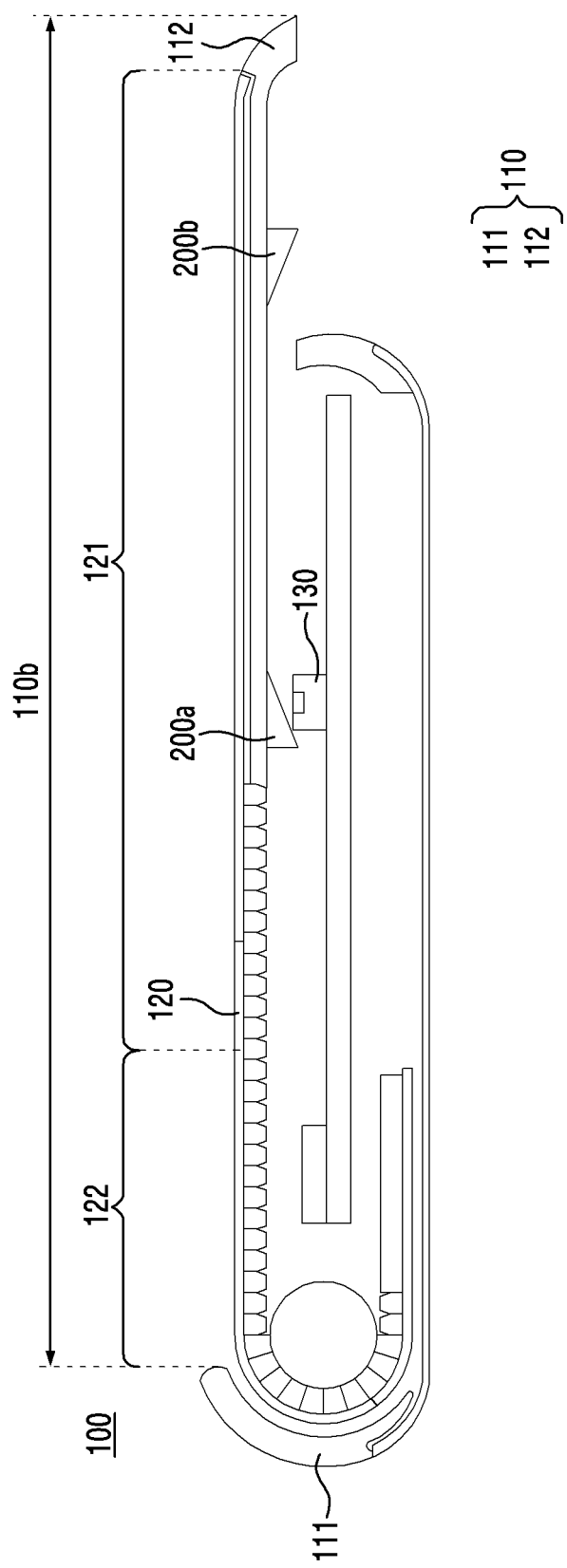
FIG. 2B is a cross-sectional view of the electronic device taken along line II-II in a second state according to various embodiments.

FIG. 2A is a cross-sectional view of an electronic device in a first state (e.g., the contracted state) according to various embodiments. FIG. 2B is a cross-sectional view of the electronic device in a second state (e.g., the extended state) according to various embodiments. FIG. 2A is a cross-sectional view of the electronic device of FIG. 1A or FIG. 1B, taken along line I-I in the according to various embodiments. FIG. 2A is a cross-sectional view of the electronic device of FIG. 1A or FIG. 1B, taken along line II-II according to various embodiments. In an embodiment, the first state may be referred to as a first shape, and the second state may be referred to as a second shape. For example, the first shape may include a normal state, a contracted state, or a closed state, and the second shape may include an extended state or an opened state.

In FIG. 2A, the state of the housing (the extended or contracted state) will be described with reference to the components of the electronic device 100 of FIG. 1A. Regarding the description of FIG. 2A, a description corresponding to, the same as, or similar to that made above may not be repeated.

According to an embodiment, the first state and the second state may correspond to the contracted state and the extended state of the housing 110, respectively. According to an embodiment, in a first state in which the second housing 112 is separated from the first housing 111 by a first distance 110a, the second partition member 200b may be located in an area corresponding to the optical sensor 130. For example, in the first state, the second partition member 200b may be present between the light emitter (e.g., the light emitter 471 of FIG. 3) and the light receiver (e.g., the light receiver 472 of FIG. 3) of the optical sensor 130.

According to an embodiment, in the second state in which the second housing 112 is separated from the first housing 111 by a second distance 110b, the first partition member 200a may be located in an area corresponding to the optical sensor 130. For example, in the second state, the first partition member 200a may be present between the light emitter and the light receiver of the optical sensor 130.

According to an embodiment, as in the illustrated example, the first partition member 200a and the second partition member 200b may be disposed at positions corresponding to a start point and an end point of the movement path of the display 120 (e.g., the arrows in FIGS. 1A and 1B). For example, when the display 120 is in the first state (e.g., the maximally contracted state), the second partition member 200b may be disposed between the display 120 and the optical sensor 130, and when the display 120 is in the second state (e.g., in the maximally extended state), the first partition member 200a may be disposed between the display 120 and the optical sensor 130.

Figure 3:
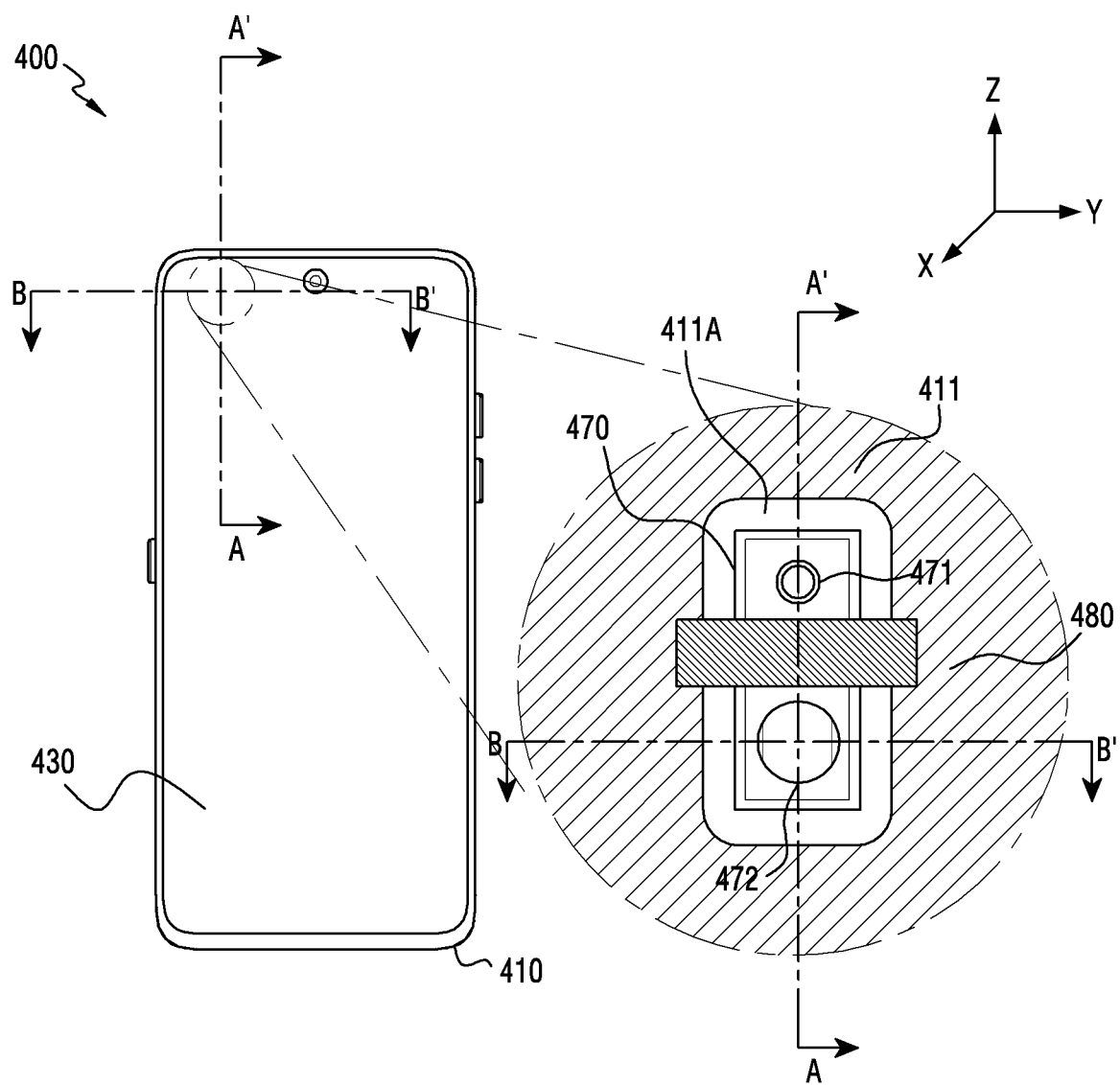
FIG. 3 is a diagram illustrating a partition member and an optical sensor disposed on a surface of an electronic device according to various embodiments.

FIG. 3 is a diagram illustrating a partition member and an optical sensor disposed on a surface of an electronic device according to various embodiments.

Referring to FIG. 3, an electronic device 400 according to an embodiment may include a housing 410, a support member 411, a display 430, an optical sensor 470, and a partition member 480. At least one of the components of the electronic device 400 may be the same as or similar to at least one of the components of the electronic device 100 of FIG. 1A or the electronic device 300 of FIG. 1B, and a redundant description may not be repeated.

According to an embodiment, the display 430 may include an unbreakable (UB) type OLED display (e.g., a curved display) including an organic light-emitting diode (OLED) or a micro light-emitting diode (LED). According to an embodiment, the display 430 may have a touch panel (not illustrated) to be configured with at least a portion thereof and may include an on-cell touch active-matrix organic light-emitting diode (OCTAMOLED) display. In addition, the display 430 is not limited thereto and may be configured in various ways (e.g., an add-on type or an in-cell type).

According to an embodiment, the optical sensor 470 may be located on the rear surface of (under) the display to overlap at least one area of the display 430 when viewed from the front side of the housing 410 (e.g., in the +x direction of FIG. 3). The optical sensor 470 may include a light emitter 471 and a light receiver 472, an opening 411A penetrating at least one area of the support member 411 is provided in the support member 411, and the optical sensor 470 may be at least partially located inside the opening 411A. According to an embodiment, as illustrated, the optical sensor 470 may be vertically mounted and may have a structure in which the upper end is a light emitter 471 and the lower end is a light receiver 472. According to an embodiment, the light receiver 472 may include a photo diode (PD) capable of receiving external light.

According to an embodiment (not illustrated), but not limited to the illustrated embodiment, the optical sensor 470 may be mounted horizontally and may have a structure in which the right end (e.g., the right side of line I-I or line II-II of FIG. 11A) is the light emitter 471 and the left end (e.g., the left side of line I-I or line II-II of FIG. 11A) is the light receiver 472.

According to an embodiment, the optical sensor 470 may include various types of sensors using intensity of light. For example, the optical sensor 470 may include a spectrometer, a gesture sensor, an ultraviolet (UV) sensor, or an infrared (IR) sensor. According to an embodiment, the partition member 480 may be located between the display 430 and the optical sensor 470. The partition member 480 may be made of a matte black material to absorb crosstalk incident toward the light receiver 472. As an example, the partition member 480 may be made of a compressible elastic material (e.g., sponge, rubber, or polymer) to compensate for an airgap between the display 430 and the optical sensor 470, so, when an external pressure is applied to the display 430, it is possible to prevent and/or reduce the display 430 from being damaged by the optical sensor 470. As an example, the compressible elastic material may refer, for example, to a property of an object having a compressibility of 30 to 40% or more.

According to an embodiment, the partition member 480 may have a straight-line shape, and by being located between the light emitter 471 and the light receiver 472 when viewed from above the front surface of the housing 410, it is possible for the partition member 480 to isolate the light emitter 471 and the light receiver 472 of the optical sensor 470.

According to an embodiment, when the airgap between the cover panel 431 and the optical sensor 470 is designed to be 0.4 mm or less, a partition member 480 having a thickness (or height) of 0.4 mm or less corresponding to the airgap may be disposed between the cover panel 431 and the optical sensor 470.

Figure 4A:
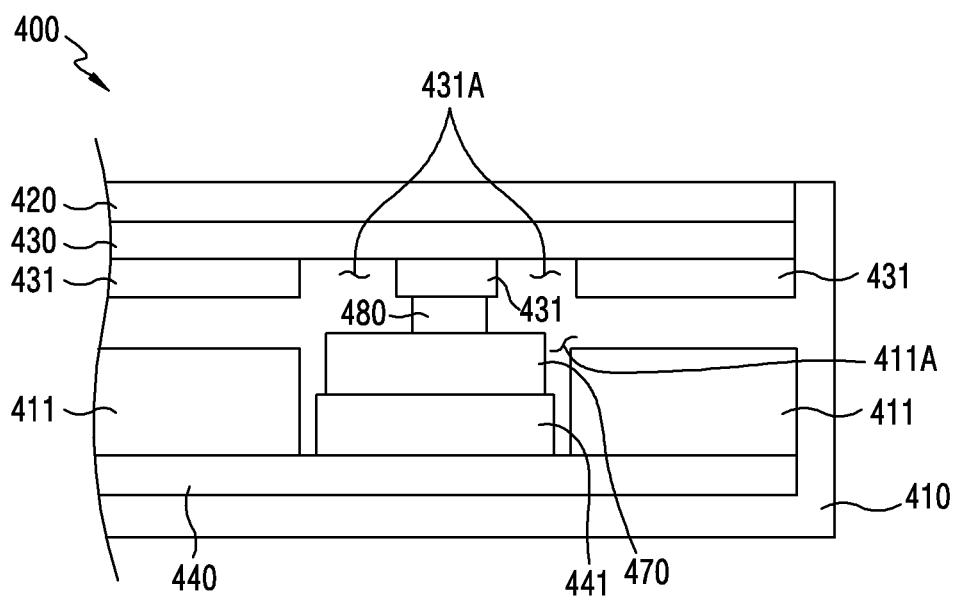
FIG. 4A is a cross-sectional view of the electronic device of FIG. 3, taken along line A-A' according to various embodiments.
Figure 4B:
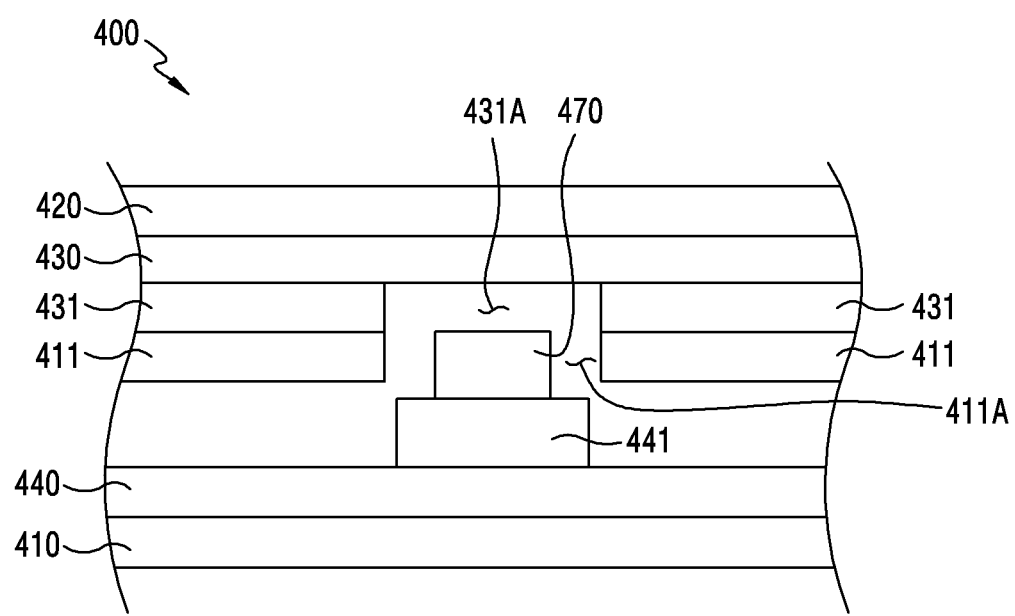
FIG. 4B is a cross-sectional view of the electronic device of FIG. 3, taken along line B-B' according to various embodiments.

FIG. 4A is a cross-sectional view of the electronic device 400 of FIG. 3 taken along line A-A', and FIG. 4B is a cross-sectional view of the electronic device 400 of FIG. 3 taken along line B-B' according to various embodiments.

Referring to FIGS. 4A and 4B, an electronic device 400 according to various embodiments may include a housing 410, a front plate 420, a display 430, a cover panel 431, a support member 411, an optical sensor 470, a partition member 480, an interposer 441, a printed circuit board 440 (e.g., a printed circuit board (PCB), a printed board assembly (PBA), a flexible PCB (FPCB), or a rigid-flexible PCB (RFPCB).

According to an embodiment, the front plate 420 may include a transparent cover (or a window). For example, the transparent cover is a thin film layer that is capable of protecting the display 430 from the outside and may be implemented in a thin film form (e.g., a thin film layer) that is capable of contributing to flexibility. According to an embodiment, the transparent cover may include a plastic film (e.g., a polyimide film) or thin glass (e.g., ultra-thin glass (UTG)).

According to an embodiment, the cover panel 431 may be attached to the rear surface of the display 430 to prevent and/or inhibit the display 430 from being twisted or bent. As an example, the cover panel 431 may include a plurality of layers for various functions. Various polymer adhesive members (not illustrated) may be disposed between the plurality of layers. For example, the cover panel 431 may include an embossed layer (e.g., the embossed layer 432 of FIG. 6A), a buffer layer, or a metal layer.

According to an embodiment, although not illustrated in the drawing, the embossed layer (e.g., the embossed layer 432 of FIG. 6A) may block light incident from the outside and may be provided with an embossed pattern to have a bumpy and bubble-containing structure. In addition, the embossed layer may be coated with black to prevent and/or reduce the components inside the electronic device 400 from being visually recognized from the outside of the electronic device 400.

According to an embodiment, the buffer layer may alleviate an external impact applied to the display 430. For example, the buffer layer may include a sponge layer or a cushion layer.

According to an embodiment, the metal layer may prevent and/or reduce the display 430 from being twisted or bent and may diffuse, disperse, or dissipate heat generated from the electronic device 400 or the display 430. In addition, the metal layer may absorb or shield electromagnetic waves. According to an embodiment, the metal layer may include a composite sheet or a copper (Cu) sheet. For example, the composite sheet may be a sheet obtained by combining and processing layers or sheets having different properties and may include at least one of polyimide or graphite. The composite sheet may also be replaced with a single sheet containing one material (e.g., polyimide or graphite).

According to an embodiment, at least some of the plurality of layers included in the cover panel 431 may include an opening (or a hole) provided to correspond to a sensor (e.g., an optical sensor 470) located inside the electronic device 400. The sensor may overlap the opening or may be at least partially inserted into the space of the opening. For example, the opening may have a size corresponding to a field of view (FOV) of the optical sensor 470. In addition, two or more layers of the cover panel 431 may each include an opening, and the openings provided in respective layers may overlap each other and may have substantially the same size and shape. According to various embodiments, the sizes or shapes of openings formed in respective layers may not be the same.

According to an embodiment, at least one hole 431A may be provided in one area of the cover panel 431. As an example, the at least one hole 431A may be provided in an area corresponding to the positions of the light emitter 471 and the light receiver 472 of the optical sensor 470 to allow light generated by the light emitter 471 to pass through the display 430 or to allow light reflected from an object (e.g., a user or a thing) to be introduced into the light receiver 472.

According to an embodiment, the support member 411 may protrude from the side surface of the housing 410 (e.g., the side surface 110c in FIG. 1A) or may be integrally configured with the side surface of the housing 410 to support the display 430 to which the cover panel 431 is attached. An opening 411A for mounting an electronic component (e.g., an optical sensor) may be provided in at least one area of the support member 411.

According to an embodiment, the optical sensor 470 may be at least partially located inside the opening 411A of the support member 411 to obtain information such as whether there is an object or whether the object is approaching. As an example, the optical sensor 470 may be electrically connected to the printed circuit board 440 below the optical sensor 470 via the interposer 441. For example, an output value including object information of the optical sensor 470 may be transmitted to the printed circuit board 440 electrically connected thereto, and a processor (e.g., the processor 1520 illustrated in FIG. 15) mounted on the printed circuit board 440 may control driving of the electronic device 400 in response to the output value of the optical sensor 470. A driving control operation of the electronic device 400 by the processor will be described later.

According to an embodiment, the partition member 480 may be located between the display 430 and the optical sensor 470. For example, the partition member 480 may be located between the cover panel 431 attached to the rear surface of the display 430 and the optical sensor 470. As illustrated in FIG. 3, the partition member 480 may be located between the light emitter 471 and the light receiver 472 of the optical sensor 470 and may block crosstalk generated by diffuse reflection from flowing into the light receiver 472. As an example, the partition member 480 may be made of an elastic material (e.g., sponge, rubber having a high compressibility, or polymer), and the partition member 480 may be located between the display 430 and the optical sensor 470 in a compressed state to prevent and/or reduce a gap (e.g., airgap) from occurring between the display 430 and the optical sensor 470. For example, an inner space between the display 430 and the optical sensor 470 may be completely blocked in the area where the partition member 480 is disposed.

According to an embodiment, the partition member 480 may be made of an elastic material having a predetermined (e.g., specified) compressibility to compensate for a height deviation of the optical sensor 470, the interposer 441, and/or A the printed circuit board 440, which may occur in the process of manufacturing.

Figure 5:
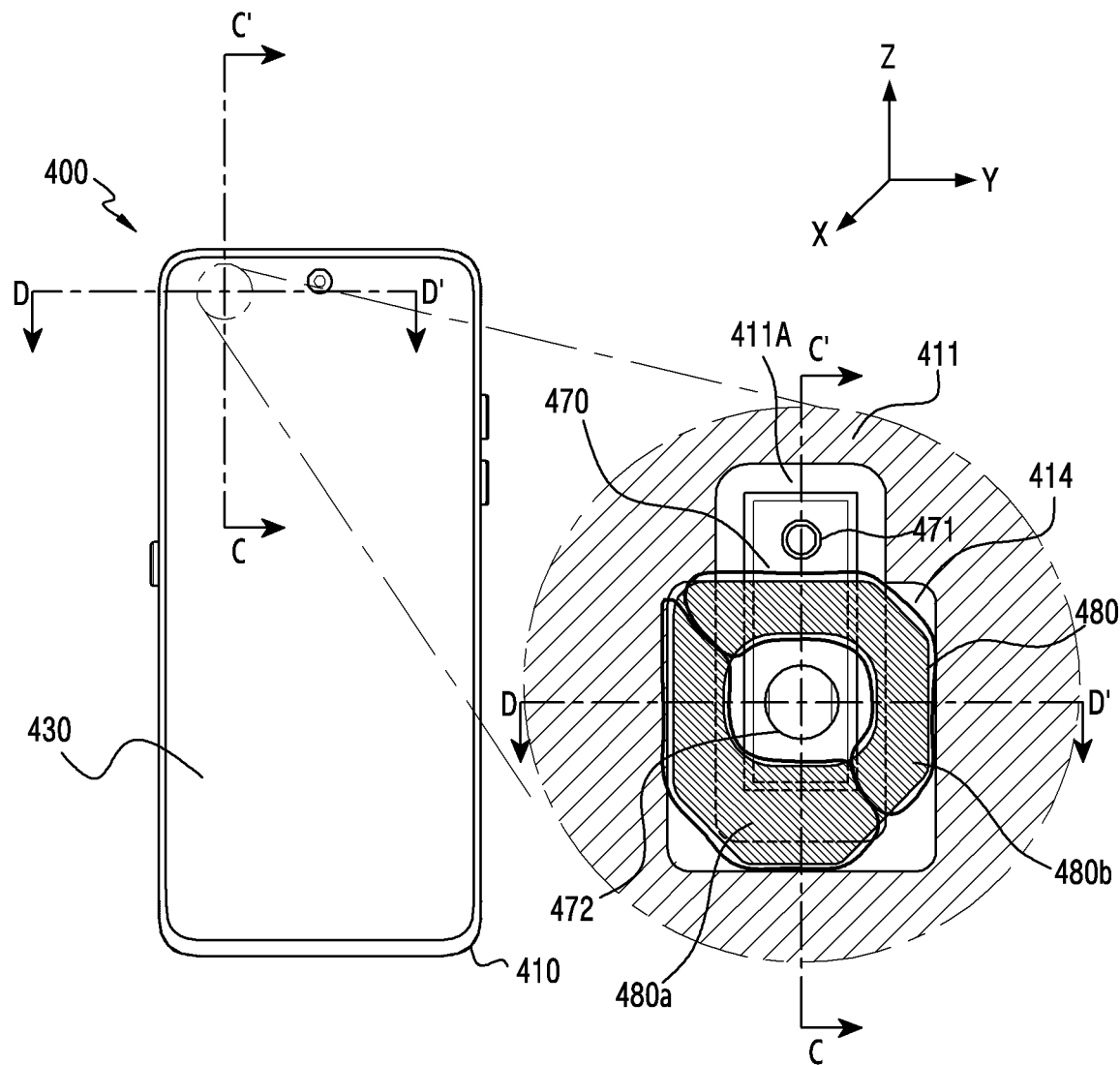
FIG. 5 is a diagram illustrating a partition member and an optical sensor disposed on a surface of an electronic device according to various embodiments.

FIG. 5 is a diagram illustrating a partition member and an optical sensor disposed on a surface of an electronic device according to various embodiments.

Referring to FIG. 5, an electronic device 400 according to an embodiment may include a housing 410, a support member 411, a display 430, an optical sensor 470, and a partition member 480. At least one of the components of the electronic device 400 may be the same as or similar to at least one of the components of the electronic device 100 of FIG. 1A, the electronic device 300 of FIG. 1B, or the electronic device of FIG. 3 and a redundant description may not be repeated.

According to an embodiment, an opening 411A may be provided in at least one area of the support member 411, and the optical sensor 470 may be located inside the opening 411A.

According to an embodiment, the partition member 480 may be located between the display 430 and the optical sensor 470 and may be provided to entirely surround the light receiver 472 of the optical sensor 470. For example, the partition member 480 may have a column shape which is a donut or ring-shape when viewed from above the front surface of the housing 410 to entirely surround a peripheral area of the light receiver 472.

As illustrated in FIG. 3, the partition member (e.g., the partition member 480 in FIG. 3) is located only in a partial area between the light emitter (e.g., the light emitter 471 in FIG. 3) and the light receiver (e.g., the light receiver 472 in FIG. 3), light diffusely reflected from the display (e.g., 430 in FIG. 3) may not be completely blocked by the partition member and may be re-reflected by a partial area of the partition member to flow into the light receiver. According to various embodiments (not illustrated), with the partition member 480 entirely surrounding the light receiver 472, the electronic device 400 may reduce crosstalk diffusely reflected from the display 430 and flowing into the light receiver 472, as well as crosstalk that is re-reflected by the partition member 480 and introduced into the light receiver 472. According to an embodiment, the partition member 480 may be seated in a seating groove 414 provided in the support member 411.

Figure 6A:
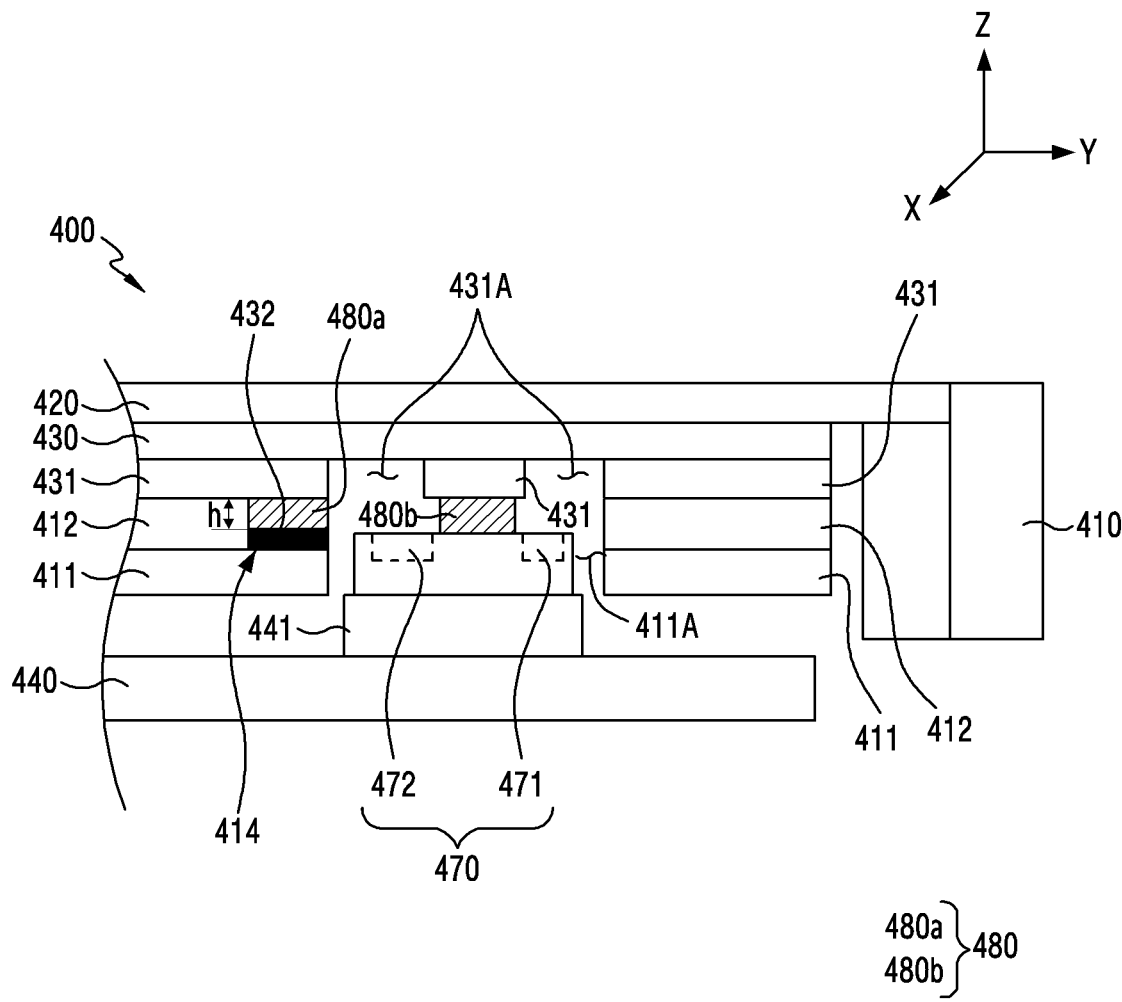
FIG. 6A is a cross-sectional view of the electronic device of FIG. 5, taken along line C-C' according to various embodiments.
Figure 6B:
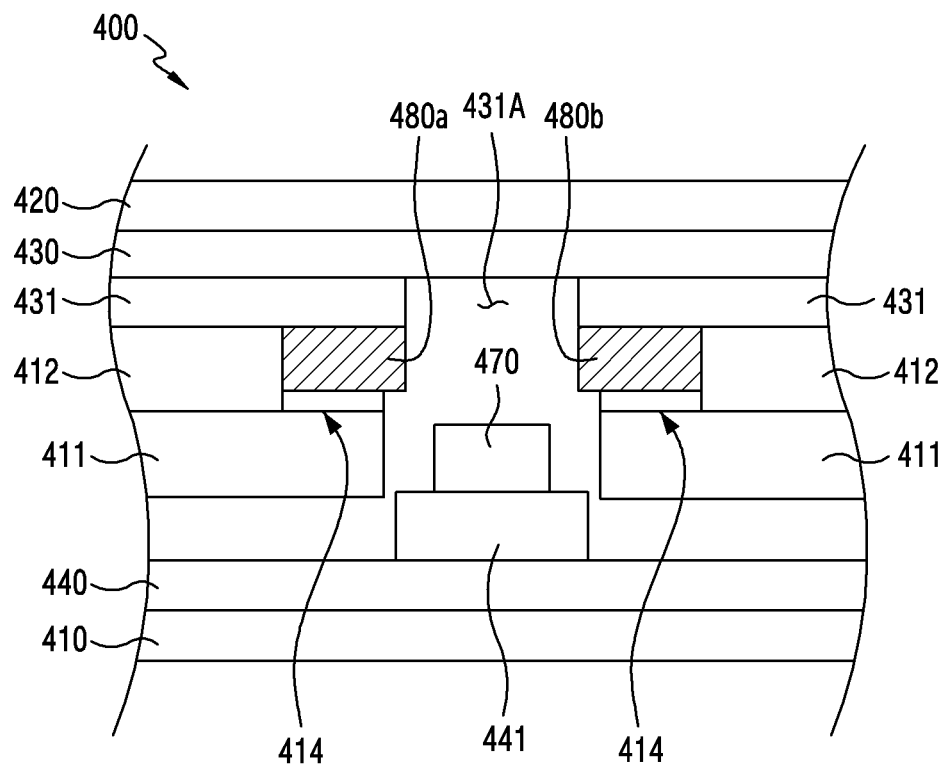
FIG. 6B is a cross-sectional view of the electronic device of FIG. 5, taken along line D-D' according to various embodiments.

FIG. 6A is a cross-sectional view of the electronic device of FIG. 5, taken along line C-C' according to various embodiments. FIG. 6B is a cross-sectional view of the electronic device of FIG. 5, taken along line D-D' according to various embodiments.

Referring to FIGS. 6A and 6B, an electronic device 400 according to an embodiment may additionally include a waterproof layer 412, while including a housing 410, a front surface plate 420, a display 430, a cover panel 431, a support member 411, an optical sensor 470, a partition member 480, an interposer 441, and a printed circuit board 440 like the electronic device of FIGS. 4A and 4B (e.g., the electronic device 400 of FIGS. 4A and 4B). Hereinafter, a description for components identical or similar to those of the electronic device of FIGS. 4A and 4B may not be repeated.

[According to an embodiment, h in FIG. 6A may refer, for example, to an airgap between the cover panel 431 and the optical sensor 470. According to an embodiment, a partition member 480 having a thickness (or height) equal to or less than h corresponding to an airgap may be disposed between the cover panel 431 and the optical sensor 470.

According to an embodiment, the waterproof layer 412 may be located between the cover panel 431 and the support member 411 to prevent and/or reduce moisture from entering a space between the cover panel 431 and the support member 411. The waterproof layer 412 may be made of, for example, a waterproof tape and may be attached to each of the lower surface of the cover panel 431 and the upper surface of the support member 411. The waterproof tape is merely an example of the waterproof layer 412, and the type of waterproof layer 412 is not limited thereto.

According to an embodiment, the partition member 480 (e.g., the first portion 480a) having a thickness (or height) equal to or less than h corresponding to the airgap may be disposed on at least a portion of (or under (e.g., in the −z-axis direction in FIG. 6A) the cover panel 431. In addition, according to an embodiment, an embossed layer 432 may be disposed under the first portion 480a (e.g., in the −z-axis direction in FIG. 6A). For example, the embossed layer 432 may be disposed on a line (e.g., the +y-axis direction of FIG. 6A) at least partially parallel to the waterproof layer 412 and may prevent and/or reduce the components inside the electronic device 400 from being visually recognized from the outside of the electronic device 400.

According to an embodiment, an opening (not illustrated) may be provided in an area of the waterproof layer 412 corresponding to the opening 411A in the support member 411, and a space in which an optical sensor 470 may be mounted (a mounting space) may be provided on the rear surface of the display 430. For example, the optical sensor 470 may be located inside the opening 411A in the support member 411 and the opening (not illustrated) in the waterproof layer 412 to obtain information as to whether an object is present, whether the object is approaching, and/or the like.

According to an embodiment, as illustrated in FIG. 5, the partition member 480 may have a column shape that looks like a ring or donut when viewed from above the front surface of the housing 410 and may entirely surround the peripheral area of the light receiver 472.

According to an embodiment, a first portion 480a of the partition member 480 may surround at least one area of the light receiver 472, and a second portion 480b of the partition member 480 may surround at least one area of the light receiver 472 while being disposed between the light receiver 472 and the light emitter 471.

According to an embodiment, when the partition member 480 is configured in a shape that entirely surrounds the light receiver 472, the space occupied by the partition member 480 inside the housing 410 may be widened, so there is a possibility that other components (e.g., the support member 411 and the display 430) may be damaged by the partition member 480. For example, in order to prevent and/or reduce damage to other components in the housing 410, it is necessary to secure a space in which the partition member 480 can be disposed.

In the electronic device 400 according to an embodiment, the space in which the partition member 480 can be disposed may be provided in at least a partial area inside the opening (not illustrated) in the waterproof layer 412. As a result, the partition member 480 may be provided to entirely surround the light receiver 472 without damaging other components inside the housing 410.

Figure 7:
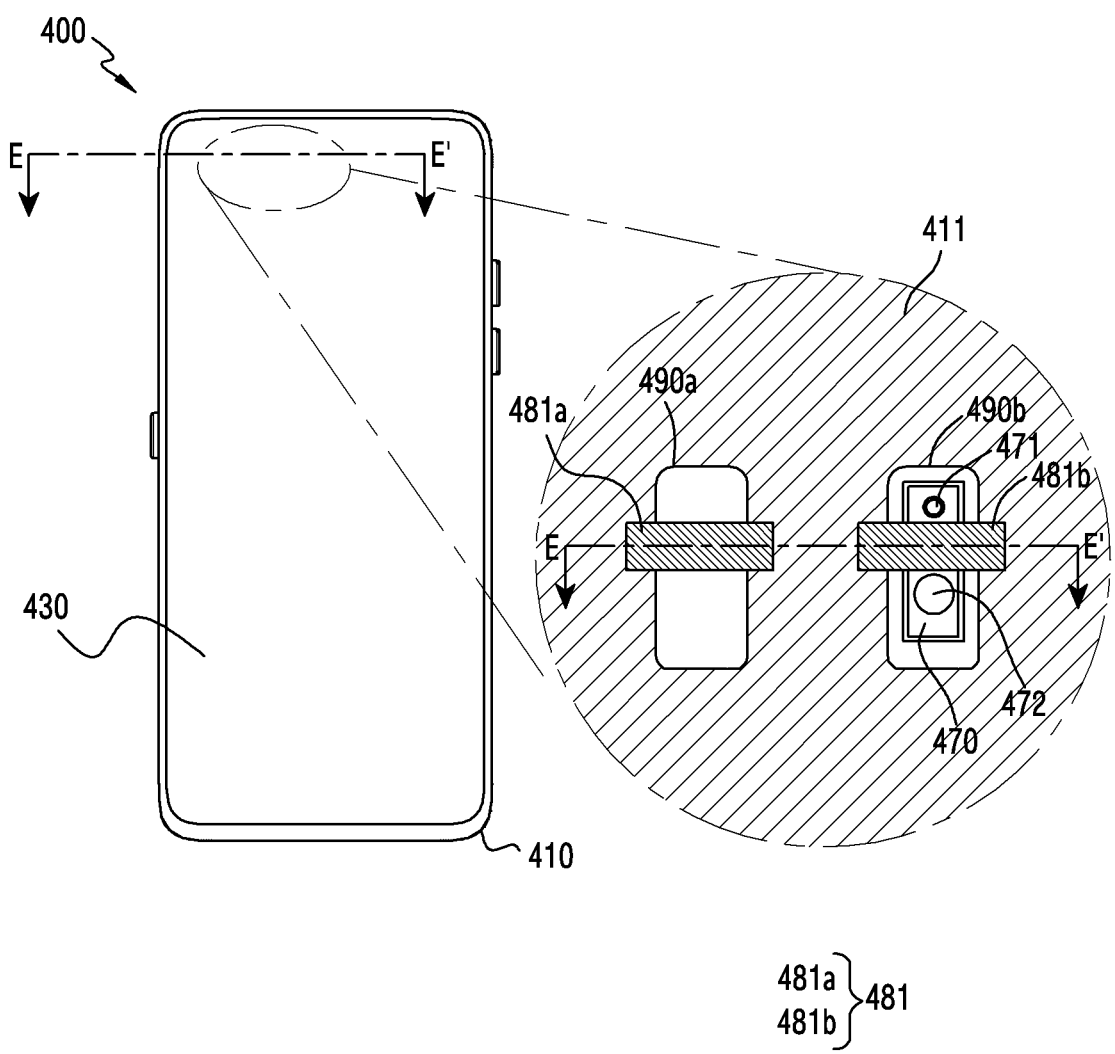
FIG. 7 is a diagram illustrating a partition member, an optical sensor, and a sensor hole disposed on a surface of an electronic device according to various embodiments.

FIG. 7 is a diagram illustrating a partition member, an optical sensor, and a sensor hole disposed on one surface of an electronic device according to various embodiments.

Referring to FIG. 7, an electronic device 400 according to an embodiment may include a housing 410, a support member 411, a display 430, an optical sensor 470, a first partition member 481a, a second partition member 481b, a first sensor hole 490a, and a second sensor hole 490b. At least one of the components of the electronic device 400 may be the same as or similar to at least one of the components of the electronic device 400 of FIG. 3 or the electronic device 400 of FIG. 5, and a redundant description may not be repeated.

According to an embodiment, an opening (not illustrated) may be provided in at least one area of the support member 411, and another component (e.g., the optical sensor 470) may be disposed inside the support member 411. As an example, the optical sensor 470 may be located inside the opening 411A and at least partially disposed on the rear surface of the display 430.

According to an embodiment, the partition member 481 may have a straight-line shape, and by being located between the light emitter 471 and the light receiver 472 when viewed from above the front surface of the housing 410, it is possible for the partition member 481 to isolate the light emitter 471 and the light receiver 472 of the optical sensor 470.

According to an embodiment, in a first state in which a second housing (e.g., the second housing 112 of FIG. 1A) is separated from a first housing (e.g., the first housing 111 of FIG. 1A) by a first distance (e.g., the first distance 110a of FIG. 2A), a second partition member 481b may be located in an area corresponding to the optical sensor 470 between the display 430 and the optical sensor 470. According to an embodiment, in the first state, the optical sensor 470 may be located in an area corresponding to the second sensor hole 490b.

According to an embodiment, in a second state in which the second housing 112 is separated from the first housing 111 by a second distance (e.g., the second distance 110b in FIG. 2B), a first partition member 481a may be located in an area corresponding to the optical sensor between the display 430 and the optical sensor 470. According to an embodiment, in the second state, the optical sensor 470 may be located in an area corresponding to the first sensor hole 490a.

Figure 8A:
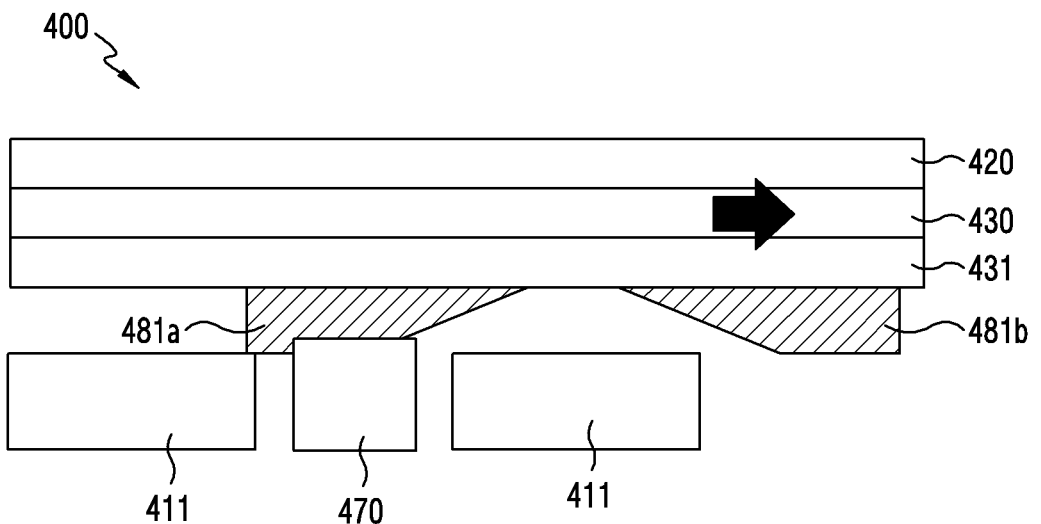
FIG. 8A is a cross-sectional view of the electronic device of FIG. 7, taken along line E-E' according to various embodiments.
Figure 8A:
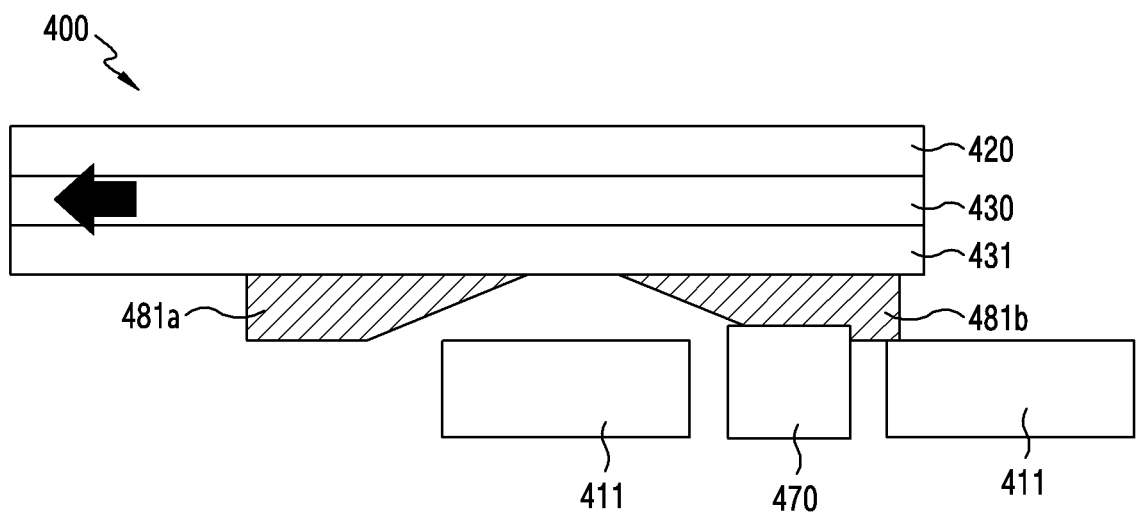

FIG. 8A is a cross-sectional view of the electronic device of FIG. 7, taken along line E-E' according to various embodiments.

Referring to FIG. 8A, an electronic device 400 according to an embodiment may include a front plate 420, a display 430, a cover panel 431, a support member 411, an optical sensor 470, and a partition member 481 like the electronic device of FIGS. 6A and 6B (e.g., the electronic device 400 in FIGS. 6A and 6B). Hereinafter, descriptions of components which are the same as or similar to those of the electronic device of FIGS. 4A and 4B and/or FIGS. 6A and 6B may not be repeated.

According to an embodiment, the partition member 481 may have a straight-line shape, and by being located between the light emitter 471 and the light receiver 472 when viewed from above the front surface of the housing 410, it is possible for the partition member 481 to isolate the light emitter 471 and the light receiver 472 of the optical sensor 470.

According to an embodiment, in the first state in which the second housing 112 is separated from the first housing 111 by the first distance, the second partition member 481b may be located in an area corresponding to the optical sensor 470 between the display 430 and the optical sensor 470. According to an embodiment, in the second state in which the second housing 112 is separated from the first housing 111 by the second distance, the first partition member 481a may be located in an area corresponding to the optical sensor between the display 430 and the optical sensor 470.

Figure 8B:
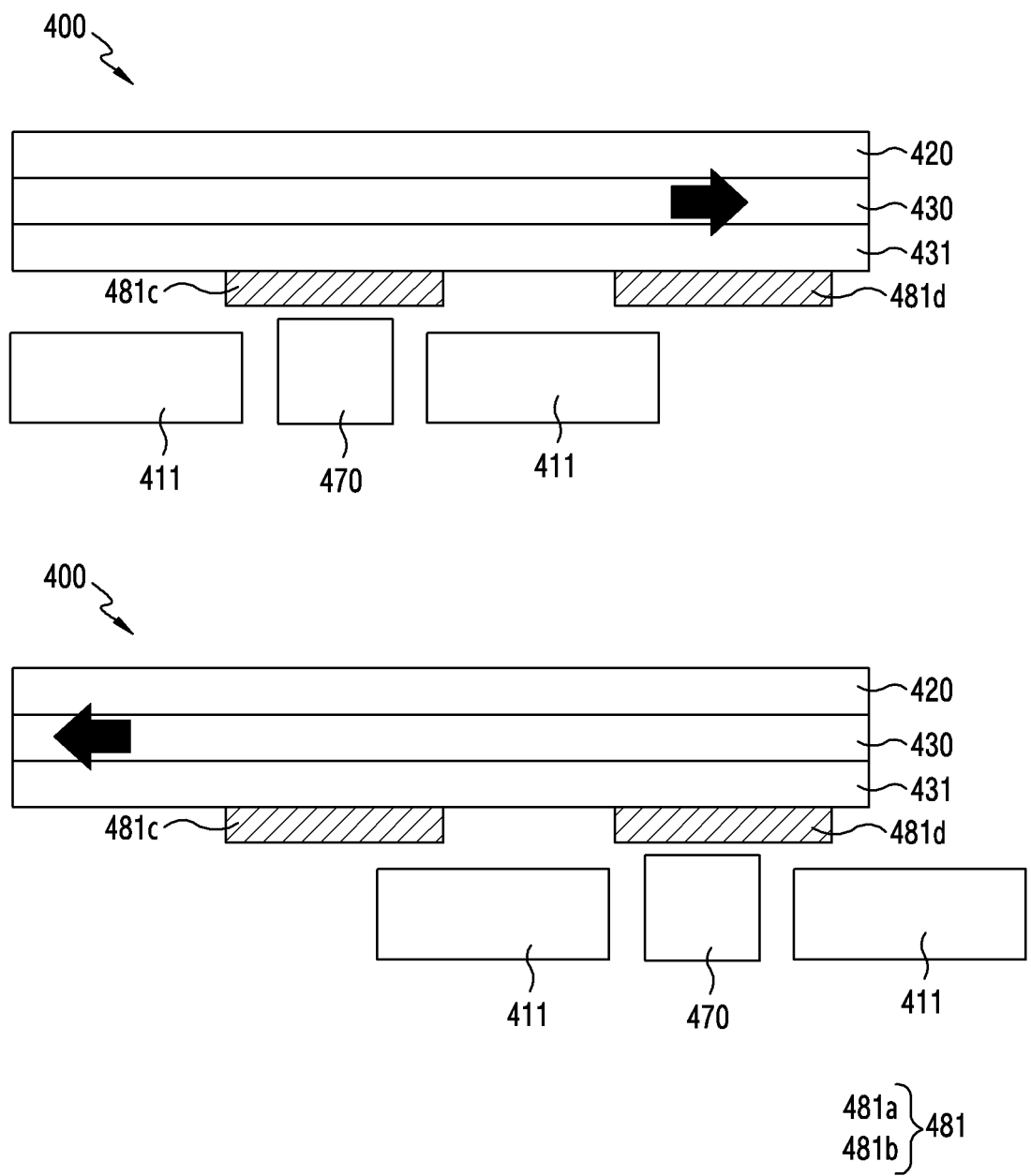
FIG. 8B is a cross-sectional view of the electronic device of FIG. 7, taken along line E-E' according to various embodiments.

FIG. 8B is a cross-sectional view of the electronic device of FIG. 7, taken along line E-E' according to various embodiments. A description that is identical/similar to that made above with reference to FIG. 8B may not be repeated.

According to an embodiment, the partition member 481 may be made of an elastic material, and since the partition member 481 is spaced apart from the optical sensor 470 by a predetermined distance, it is possible minimize and/or reduce interference with the optical sensor during the movement of the display 430 even when the partition member 481 has a right-angle shape.

According to an embodiment, in the first state in which the second housing 112 is separated from the first housing 111 by the first distance, the second partition member 481d may be located in an area corresponding to the optical sensor 470 to be separated from the optical sensor 470 by a predetermined distance. According to an embodiment, in the second state in which the second housing 112 is separated from the first housing 111 by the second distance, the first partition member 481c may be located in an area corresponding to the optical sensor 470 to be separated from the optical sensor 470 by a predetermined distance.

Figure 8C:
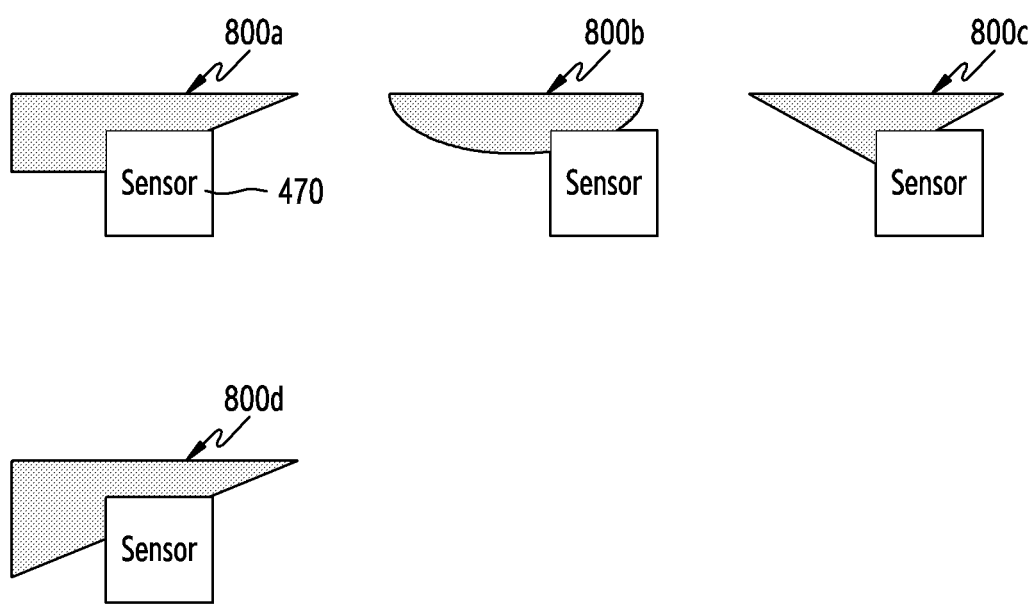
FIG. 8C is a diagram illustrating example shapes of a partition member according to various embodiments.

FIG. 8C is a diagram illustrating example shapes of a partition member according to various embodiments.

Referring to FIG. 8C, partition members (e.g., 800a, 800b, 800c and 800d) according to various embodiments may be made of an elastic material and may have a shape having a predetermined angle. For example, a partition member may have an oblique shape or a curved shape having a predetermined angle. According to an embodiment, the optical sensor 470 and the partition member may be at least partially in contact with (or overlap) each other and may have a predetermined angle and/or shape not to be affected by a state change (e.g., a first state or a second state) of the electronic device 400. For example, the partition member may have a trapezoidal shape 800a, a curved shape 800b, or a triangular shape 800c and 800d. For example, the shape of the partition member is not limited to the illustrated embodiment, and the partition member may have various shapes.

Figure 9:
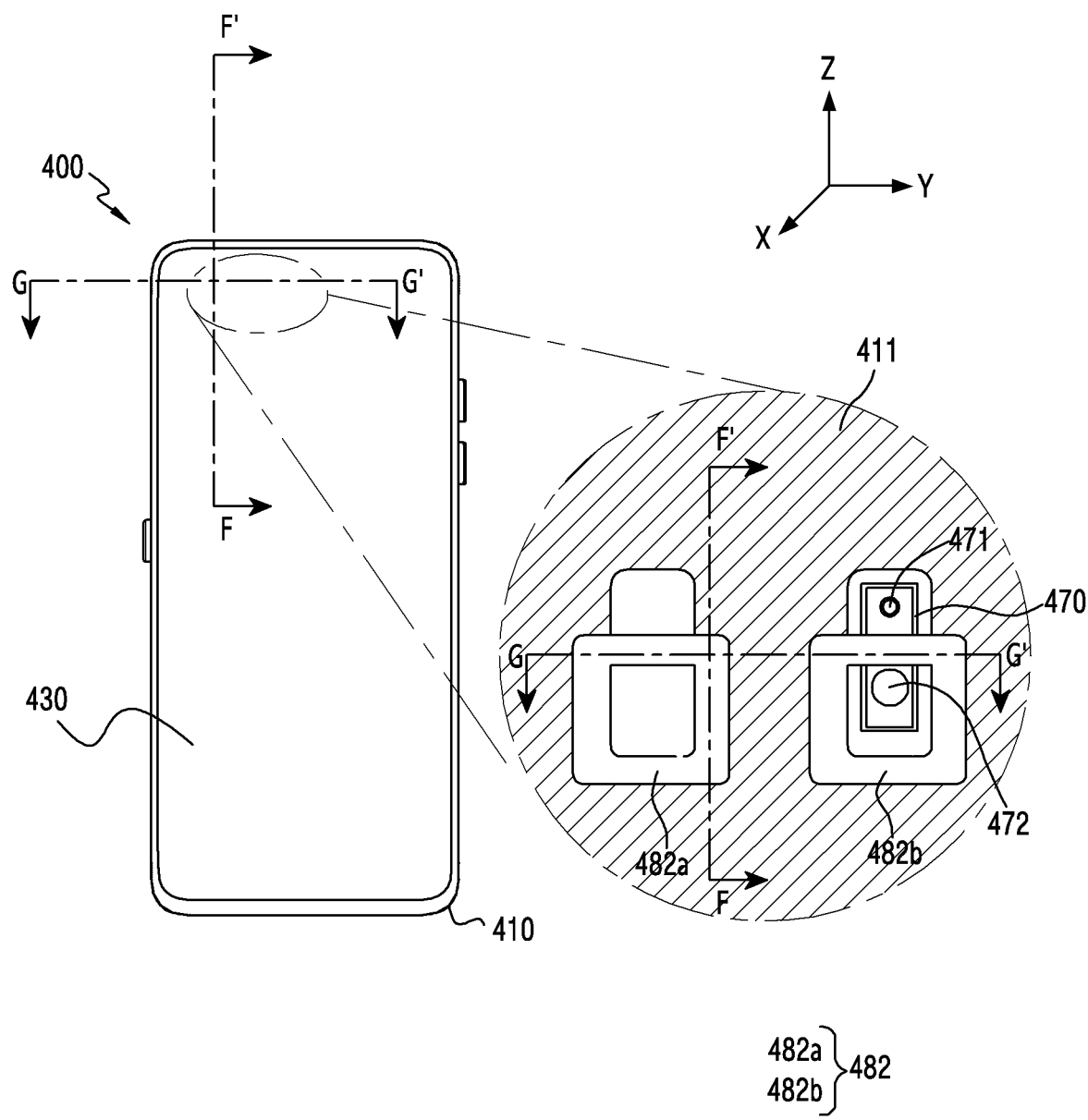
FIG. 9 is a diagram illustrating a partition member, an optical sensor, and a sensor hole disposed on a surface of an electronic device according to various embodiments.

FIG. 9 is a diagram illustrating a partition member, an optical sensor, and a sensor hole disposed on a surface of an electronic device according to various embodiments.

Referring to FIG. 9, an electronic device 400 according to an embodiment may include a housing 410, a support member 411, a display 430, an optical sensor 470, a first partition member 482a, and a partition member 482b. At least one of the components of the electronic device 400 may be the same as or similar to at least one of the components of the electronic device 400 of FIG. 3 or the electronic device 400 of FIG. 5, and a redundant description may not be repeated.

According to an embodiment, an opening (not illustrated) may be provided in at least one area of the support member 411, and another component (e.g., the optical sensor 470) may be disposed inside the support member 411. As an example, the optical sensor 470 may be located inside the opening 411A and consequently disposed on the rear surface of the display 430.

According to an embodiment, the partition member 482 may be located between the display 430 and the optical sensor 470 and may be provided to entirely surround the light receiver 472 of the optical sensor 470. For example, the partition member 482 may have a column shape, which is a donut or ring-shaped shape when viewed from above the front surface of the housing 410 to entirely surround the peripheral area of the light receiver 472.

According to an embodiment, in the first state in which the second housing 112 is separated from the first housing 111 by the first distance, the second partition member 482b may be located in an area corresponding to the optical sensor 470 between the display 430 and the optical sensor 470. According to an embodiment, in the second state in which the second housing 112 is separated from the first housing 111 by the second distance, the first partition member 482a may be located in an area corresponding to the optical sensor between the display 430 and the optical sensor 470.

Figure 10A:
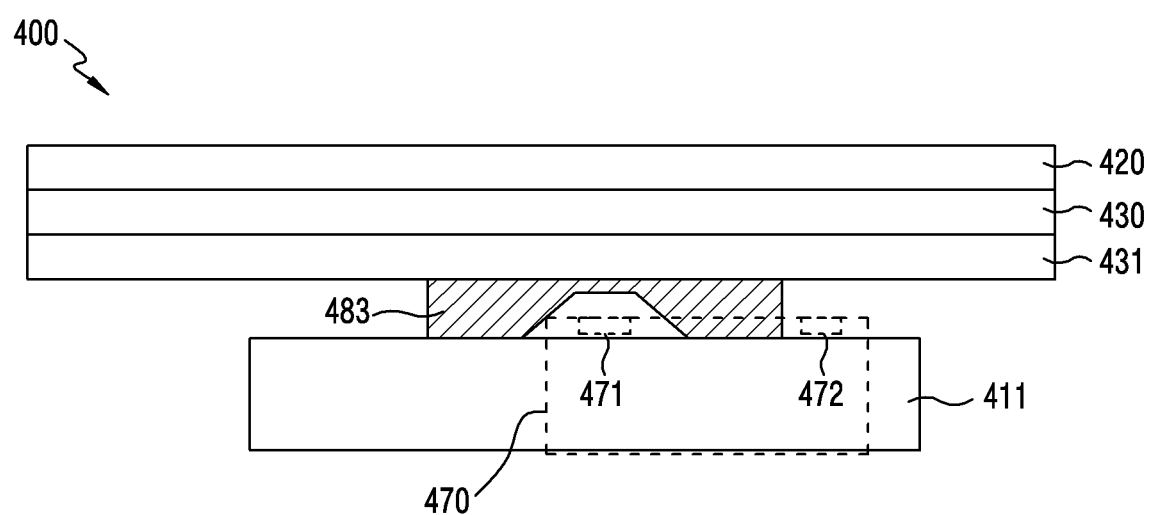
FIG. 10A is a cross-sectional view of the electronic device of FIG. 9, taken along line F-F' according to various embodiments.
Figure 10B:
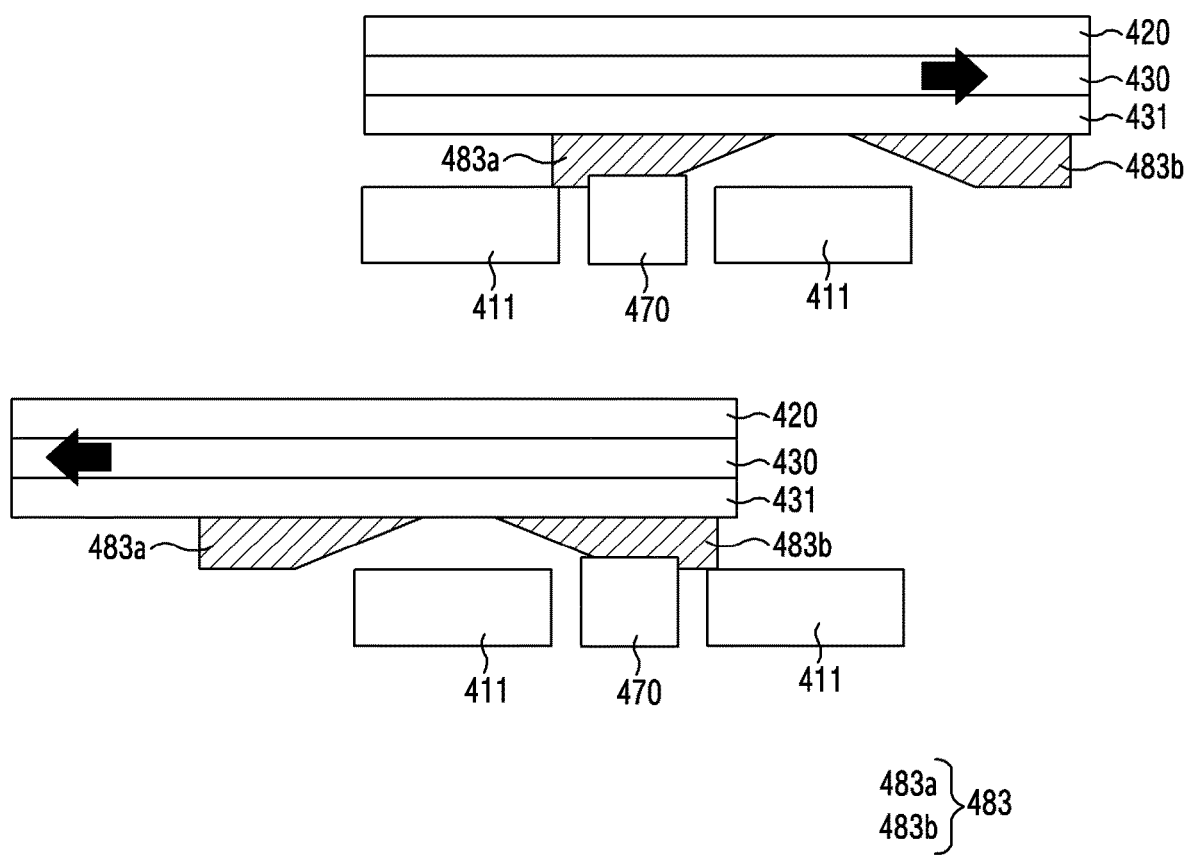
FIG. 10B is a cross-sectional view of the electronic device of FIG. 9, taken along line G-G' according to various embodiments.

FIG. 10A is a cross-sectional view of the electronic device of FIG. 9, taken along line F-F' according to various embodiments. FIG. 10B is a cross-sectional view of the electronic device of FIG. 9, taken along line G-G' according to various embodiments.

Referring to FIG. 10A or FIG. 10B, an electronic device 400 according to an embodiment may include a front plate 420, a display 430, a cover panel 431, a support member 411, an optical sensor 470, and a partition member 483 like the electronic device of FIGS. 8A and 8B (e.g., 400 in FIGS. 8A and 8B). Hereinafter, a description for components identical or similar to those of the electronic device of FIGS. 8A and 8B may not be repeated.

According to an embodiment, when the partition member 483 entirely surrounds the peripheral area of the light receiver 472, the shape of the partition member 483 is perforated like a tunnel to maintain the thickness of the partition member between the light emitter 471 and the light receiver 472 and to make the remaining portion spaced apart from the optical sensor 470. Thus, it is possible to minimize and/or reduce interference between the display 430 and the optical sensor 470 while the display 430 moves.

According to an embodiment, in the first state in which the second housing 112 is separated from the first housing 111 by the first distance, the second partition member 483b may be located in an area corresponding to the optical sensor 470 between the display 430 and the optical sensor 470. According to an embodiment, in the second state in which the second housing 112 is separated from the first housing 111 by the second distance, the first partition member 483a may be located in an area corresponding to the optical sensor between the display 430 and the optical sensor 470.

Figure 11A:
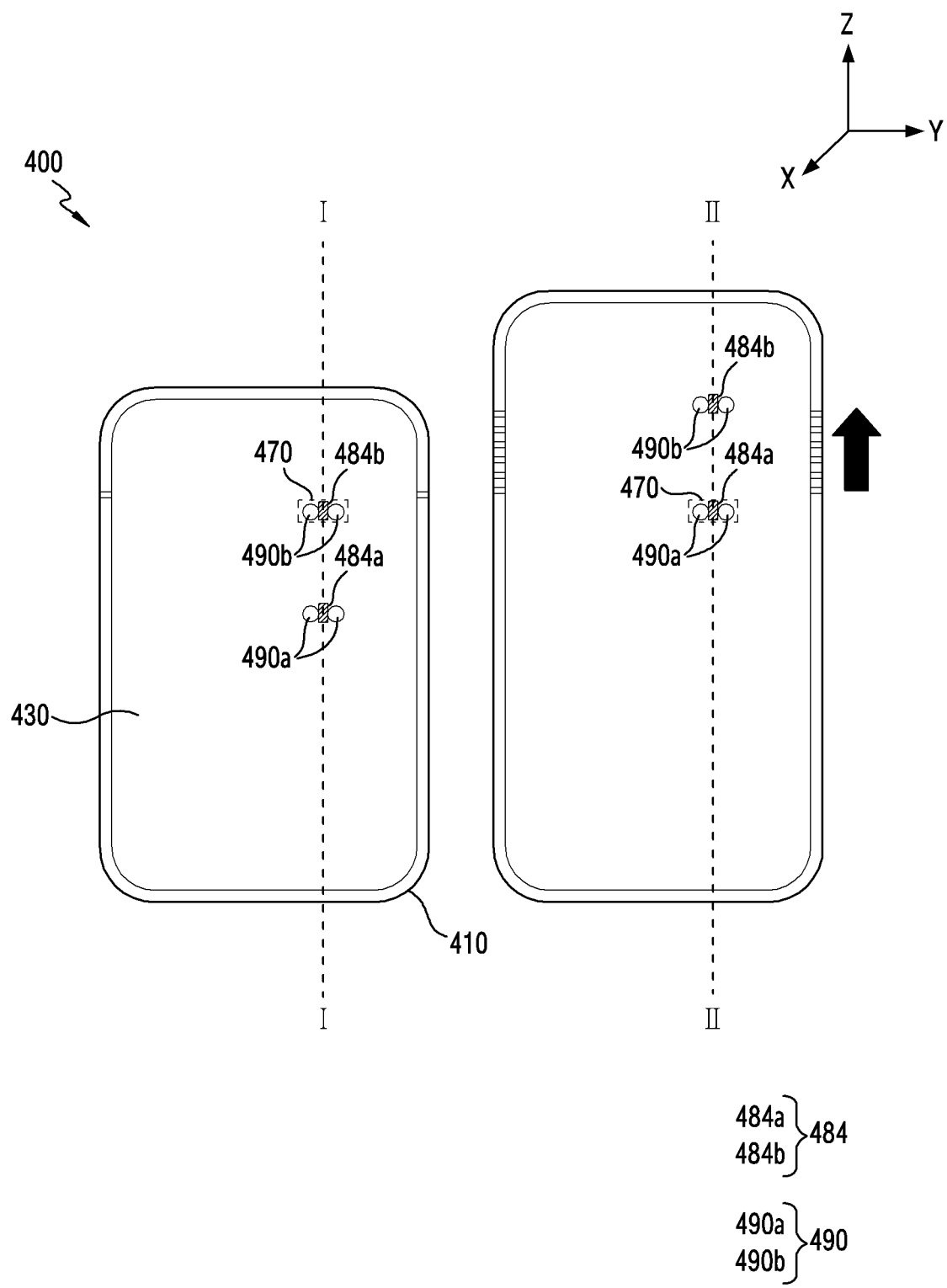
FIG. 11A is a diagram illustrating a first structure of a rollable device extending in a second direction according to various embodiments.
Figure 11B:
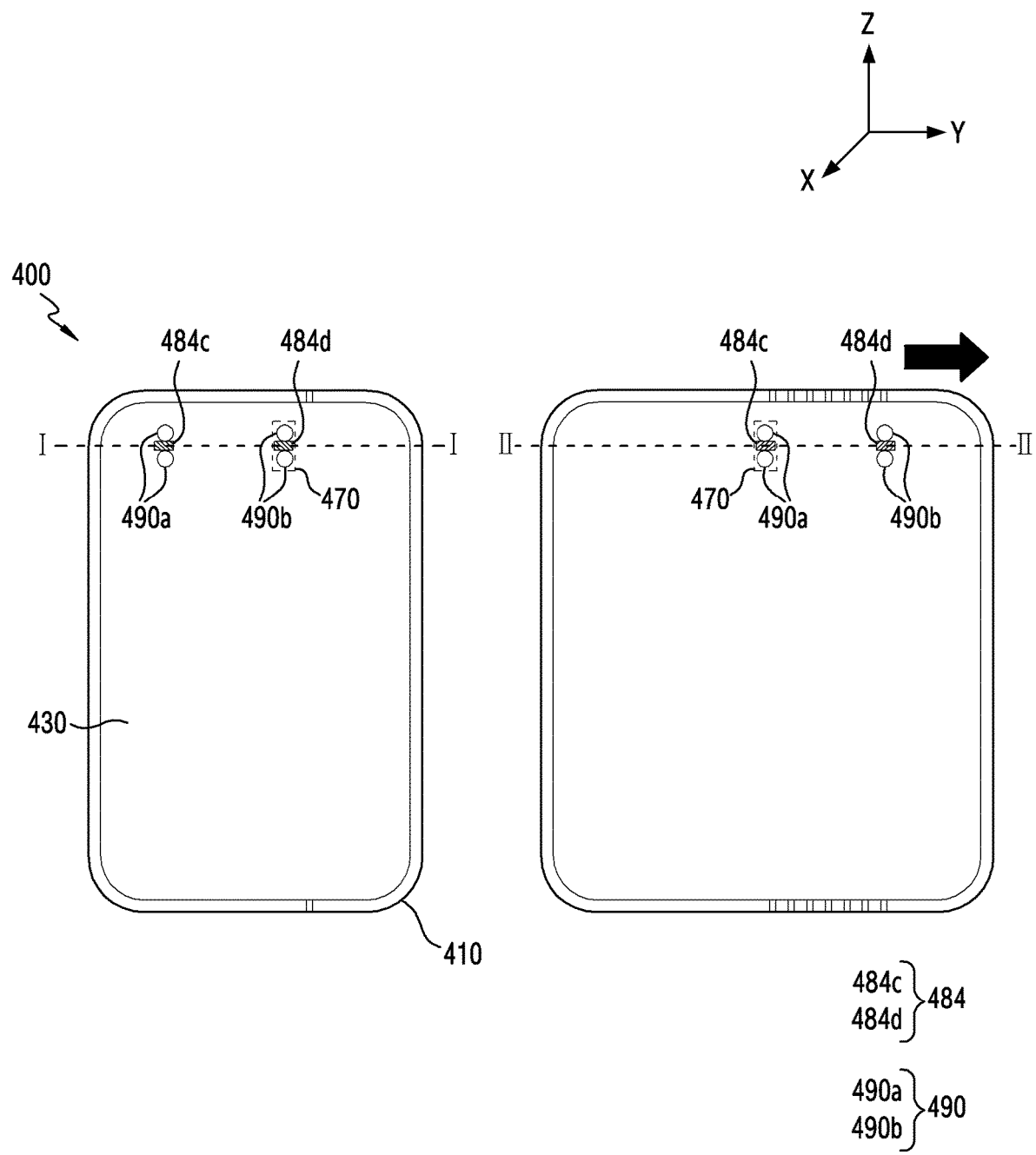
FIG. 11B is a diagram illustrating a first structure of a rollable device extending in a first direction according to various embodiments.

FIG. 11A is a diagram illustrating a first structure (e.g., a structure in which sensor holes are perforated in areas corresponding to the positions of the light emitter and the light receiver in a light emitter and a light receiver) in an electronic device 400 (e.g., a rollable device) extending in a second direction (e.g., vertically) according to various embodiments. FIG. 11B is a diagram illustrating a first structure in an electronic device 400 (e.g., a rollable device) that extends in a first direction (e.g., horizontally) according to various embodiments.

Referring to FIG. 11A or FIG. 11B, an electronic device 400 according to an embodiment may include a housing 410, a display 430, an optical sensor 470, a first partition member 484a or 484c, a second partition member 484b or 484d, a first sensor hole 490a, and a second sensor hole 490b. At least one of the components of the electronic device 400 may be the same as or similar to at least one of the components of the electronic device 100 of FIG. 1A or the electronic device 300 of FIG. 1B, and a redundant description may not be repeated.

In an embodiment, the electronic device 400 may include a contractible and/or extendable housing 410. In an embodiment, depending on the contraction and/or extension of the housing 310, the size of the entire electronic device 400 may also be contracted and/or extended.

According to an embodiment, the sensor holes 490 (e.g., first sensor holes 490a and second sensor holes 490b) may be perforated in areas corresponding to a light emitter (e.g., the light emitter 471 of FIG. 3) and a light receiver (e.g., the light receiver 472 of FIG. 3). In an embodiment, an optical sensor 470 may be accommodated at least partially inside each sensor hole 490 and may be provided to operate without interference.

According to an embodiment, in the first state in which the second housing 112 is separated from the first housing 111 by the first distance (e.g., the contracted state), the second partition member 484b or 484d and the second sensor holes 490b may be located in an area corresponding to the optical sensor 470 between the display 430 and the optical sensor 470. According to an embodiment, in the second state in which the second housing 112 is separated from the first housing 111 by the second distance (e.g., the extended state), the first partition member 484a or 484c and the first sensor holes 490a may be located in an area corresponding to the optical sensor between the display 430 and the optical sensor 470.

In an embodiment, the position of the optical sensor 470 may be fixed to the printed circuit board (e.g., the printed circuit board 440 in FIGS. 4A and 4B). In an embodiment, the partition member 484 may be located between the light emitter and the light receiver of the optical sensor 470. In an embodiment, the mounting direction of the partition member 484 may be substantially perpendicular to the mounting direction of the optical sensor 470, and the mounting direction of the partition member 484 may be substantially parallel to the direction in which the display is extended (the arrow direction) (e.g., the first direction and the second direction).

Figure 12A:
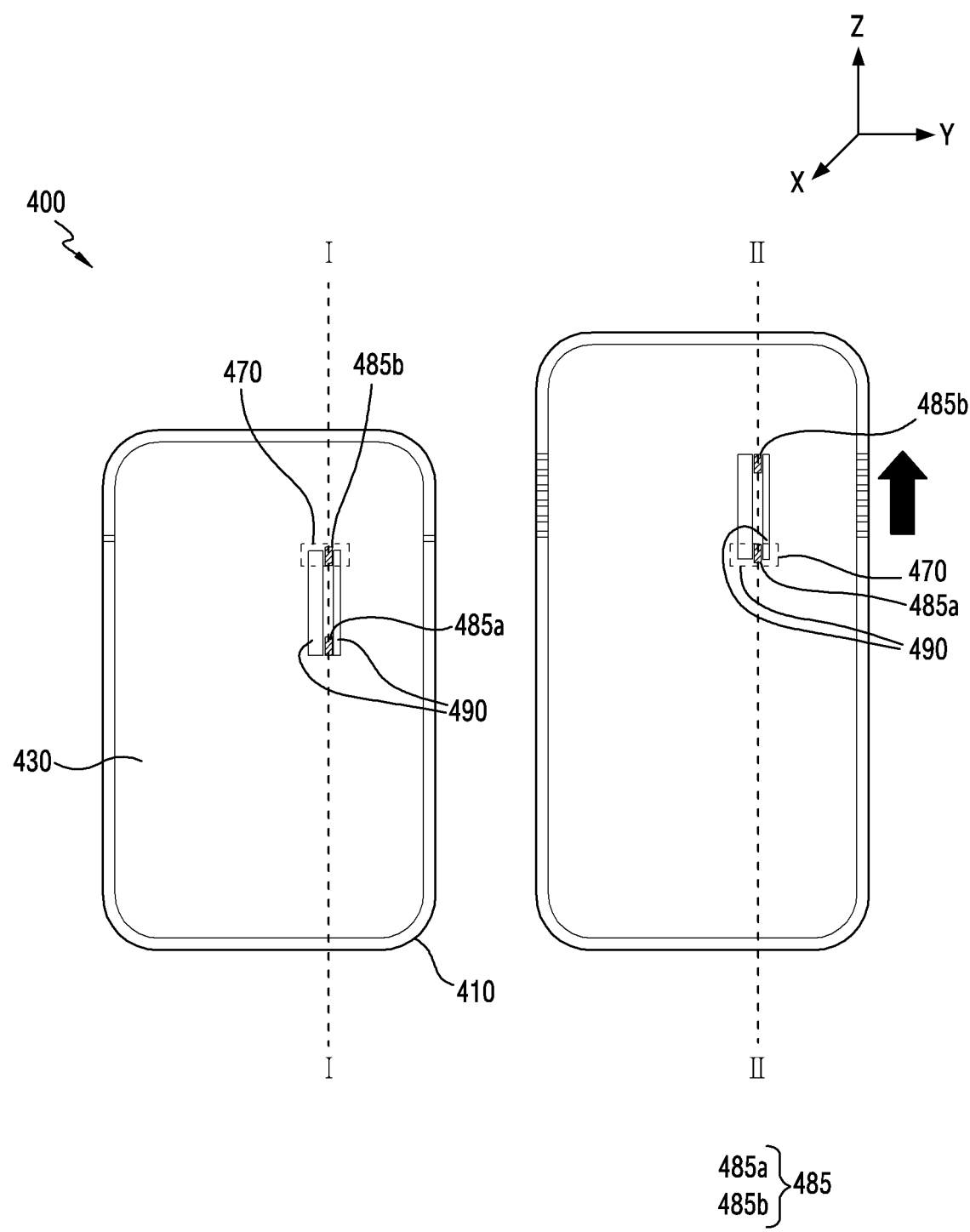
FIG. 12A is a diagram illustrating a second structure of a rollable device extending in a second direction according to various embodiments.
Figure 12B:
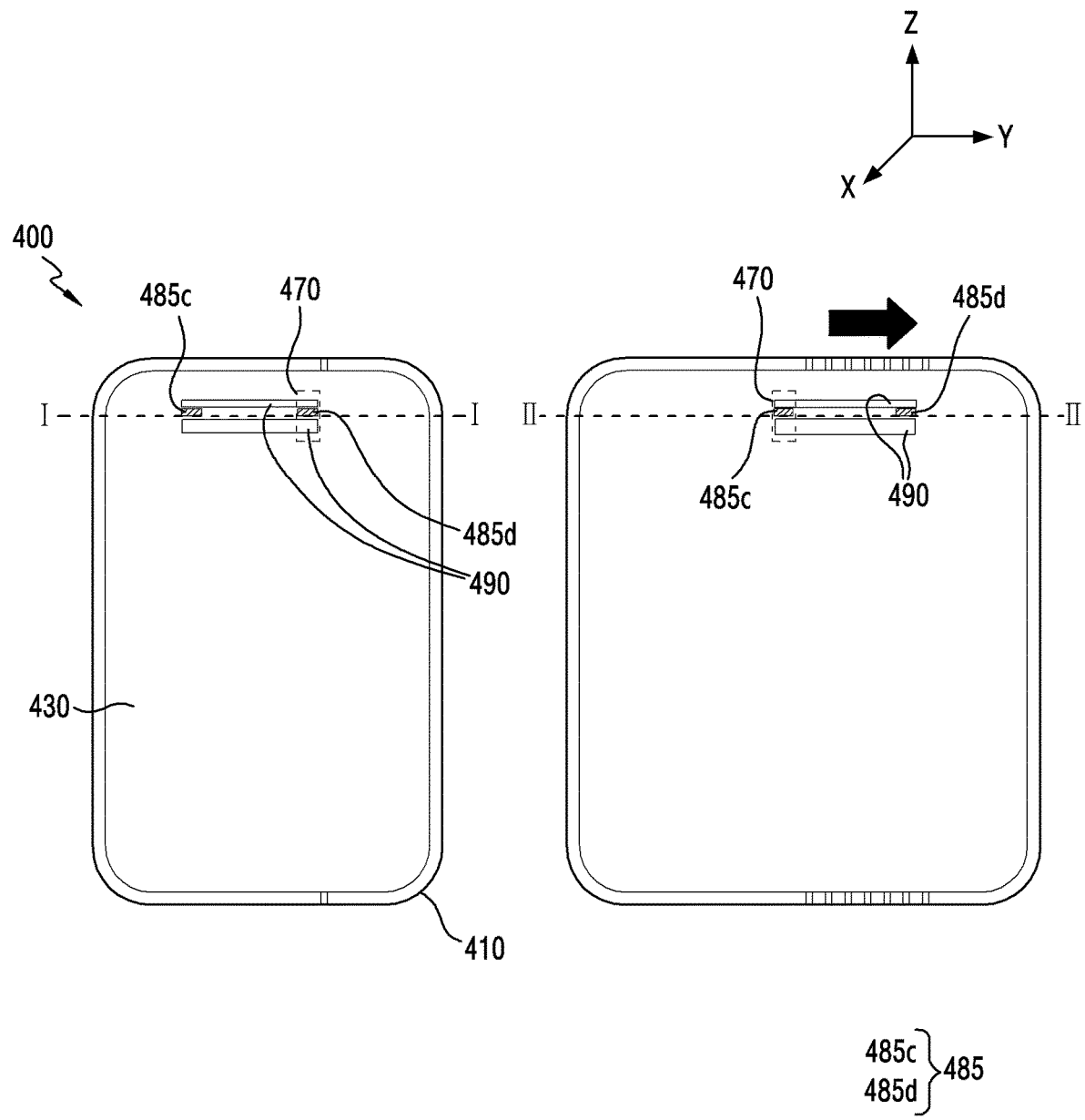
FIG. 12B is a diagram illustrating a second structure of a rollable device extended in a first direction according to various embodiments.

FIG. 12A is a diagram illustrating a second structure (e.g., a structure in which sensor holes are perforated to correspond to the movement direction of an optical sensor) in an electronic device 400 (e.g., a rollable device) extending in a second direction (e.g., vertically) according to various embodiments. FIG. 12B is a diagram illustrating a second structure in an electronic device (e.g., a rollable device) that extends in a first direction (e.g., horizontally) according to various embodiments.

Referring to FIG. 12A or FIG. 12B, an electronic device 400 according to an embodiment may include a housing 410, a display 430, an optical sensor 470, a first partition member 485a or 485c, a second partition member 485b or 485d, and sensor holes 490. At least one of the components of the electronic device 400 may be the same as or similar to at least one of the components of the electronic device 300 of FIG. 1A or the electronic device 300 of FIG. 1B, and a redundant description may not be repeated.

In an embodiment, the electronic device 400 may include a contractible and/or extendable housing 410. In an embodiment, depending on the contraction and/or extension of the housing 310, the size of the entire electronic device 300 may also be contracted and/or extended.

According to an embodiment, the sensor holes 490 may be perforated to correspond to a movement path (e.g., the arrow direction) of the optical sensor 470 when the display 430 is extended.

According to an embodiment, in the first state in which the second housing 112 is separated from the first housing 111 by the first distance (e.g., the contracted state), the second partition member 485b or 485d may be located in an area corresponding to the optical sensor 470 between the display 430 and the optical sensor 470. According to an embodiment, in the second state in which the second housing 112 is separated from the first housing 111 by the second distance (e.g., the extended state), the first partition member 485a or 485c may be located in an area corresponding to the optical sensor between the display 430 and the optical sensor 470.

Figure 13:
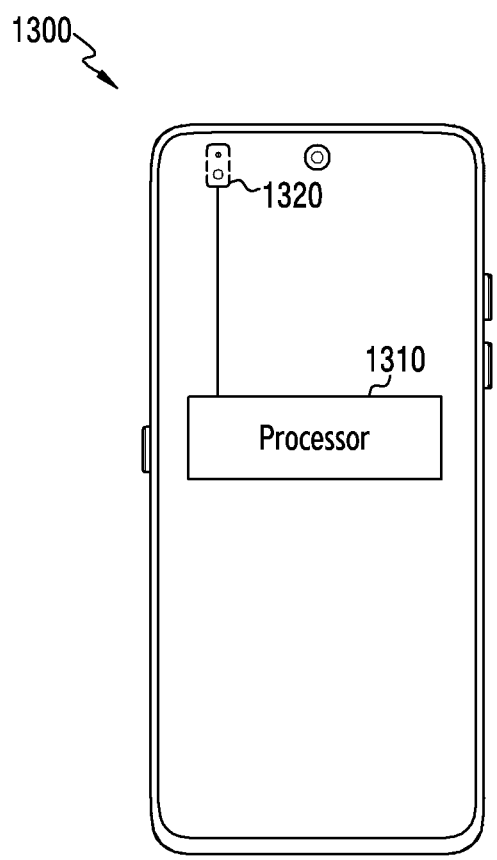
FIG. 13 is a diagram illustrating an electrical connection relationship between a processor and an optical sensor according to various embodiments.

FIG. 13 is a diagram illustrating an electrical connection relationship between a processor and an optical sensor according to various embodiments.

Referring to FIG. 13, an electronic device 1300 according to various embodiments may include a processor (e.g., including processing circuitry) 1310 (e.g., the processor 1520 of FIG. 15) and an optical sensor 1320 disposed on the rear surface a display (e.g., the display 430 of FIG. 3). According to an embodiment, the optical sensor 1320 and the processor 1310 are electrically connected to each other so that an output value of the optical sensor 1320 may be transmitted to the processor 1310, and the processor 1310 may identify the output value received from the optical sensor and may control the operation of the electronic device 1300 in response to the identified output value. According to an embodiment (not illustrated), the optical sensor 1320 may be electrically connected to a sensor hub (not illustrated), and the processor 1310 may receive an output value of the optical sensor 1320 from the sensor hub and may control the operation of the electronic device 1300. However, a detailed description of a process of controlling the operation of the electronic device 1300 by the processor 1310 will be described later.

Figure 14:
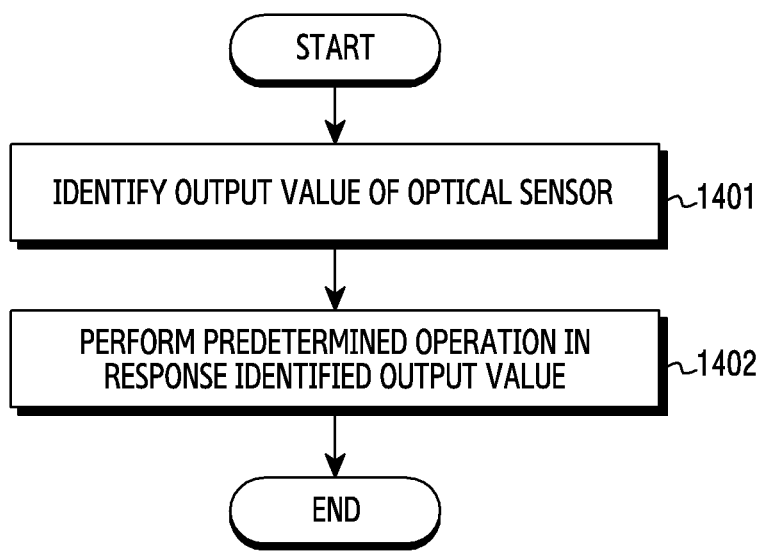
FIG. 14 is a flowchart illustrating an example operation of controlling an electronic device in response to an output value of an optical sensor according to various embodiments.

FIG. 14 is a flowchart illustrating an example operation of controlling an electronic device in response to an output value of an optical sensor according to various embodiments.

Referring to FIG. 14, in operation 1401, a processor (e.g., the processor 1310 of FIG. 13) of an electronic device (e.g., the electronic device 1300 of FIG. 13) according to an embodiment may identify an output value transmitted from an optical sensor (the optical sensor 1310 of FIG. 13). According to an embodiment, the processor may receive an output value from an optical sensor mounted on the rear surface of the display even in the state in which the display is activated (e.g., in the state of being driven).

In operation 1402, the processor of the electronic device according to an embodiment may perform an operation based on the output value of the optical sensor identified in operation 1401 (e.g., determine information of an object). As an example, the processor may determine whether an object is present near the electronic device or whether the object is approaching based on the output value of the optical sensor. The processor may control the operation of the electronic device based on the determined object information. According to an embodiment, the processor may determine whether the display is driven (ON/OFF) and/or whether an always-on-display (AOD) mode is driven (ON/OFF) based on the output value of the optical sensor identified in operation

1401. According to an embodiment, the processor may determine whether an input touch is an erroneous touch based on the output value of the optical sensor identified in operation 1401. According to an embodiment, the AOD mode may refer to a mode in which the display is always driven with low power and is used in the same meaning below.

As an example, as a result of identifying the output value of the optical sensor and/or whether a receiver (e.g., a microphone hole) is driven, when it is identified that the user is on a call through the receiver, since driving of the display is unnecessary, the processor may stop (OFF) the driving of the display in order to prevent and/or reduce unnecessary power waste. As another example, as a result of identifying the output value of the optical sensor, when it is identified that the electronic device is located in a pocket or a bag, since it is unnecessary to maintain the AOD mode, the processor may stop (OFF) the AOD mode. As another example, as a result of identifying the output value of the optical sensor, when it is identified that the user is in close proximity to the electronic device and it is identified that the application running in the electronic device is a call-related application and the user is on a call, the processor may determine whether a touch input to the display is an erroneous touch due to the user's skin. When the touch is determined to be an erroneous touch by the user's skin, the processor may not drive the display (OFF), and when the touch is not determined to be an erroneous touch, the processor may drive the display (ON) to display data/ thereby providing information to the user. The above-described examples are only some of various embodiments of the present disclosure, and the processor's control operation of the electronic device is not limited to the above examples.

Figure 15:
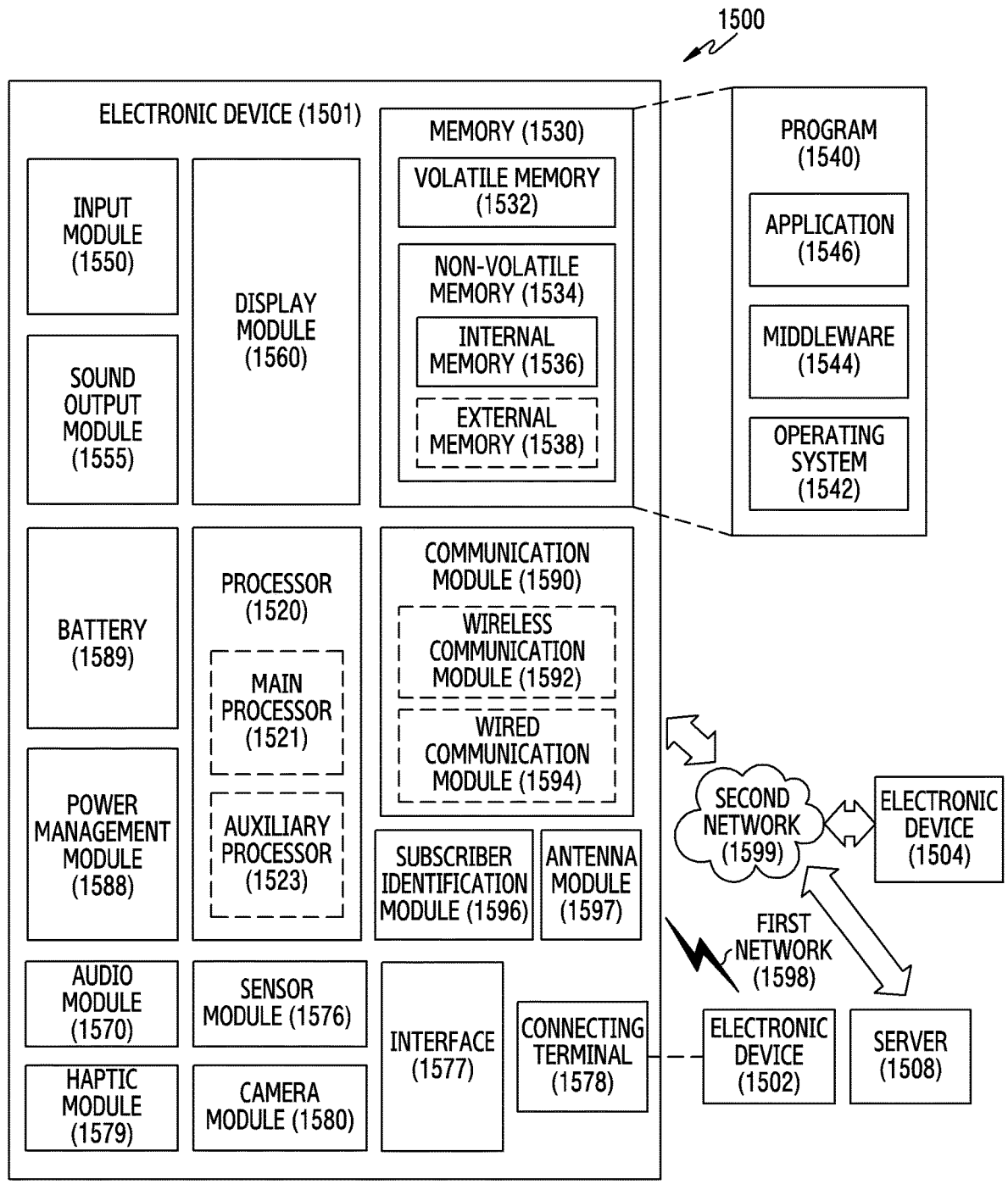
FIG. 15 is a block diagram illustrating an example configuration of an electronic device in a network environment according to various embodiments.

FIG. 15 is a block diagram illustrating an example configuration of an electronic device in a network environment according to various embodiments.

Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In various embodiments, at least one of the components (e.g., the connecting terminal 1578) may be omitted from the electronic device 1501, or one or more other components may be added in the electronic device 1501. In various embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user)

of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™ wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element including a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In an embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1A or the electronic device 300 of FIG. 1B) according to an example embodiment may include: a housing (e.g., the housing 110 in FIG. 1A or the housing 310 in FIG. 1B) including a front surface, a rear surface facing away from the front surface, and a side surface surrounding a space between the front surface and the rear surface, a display (e.g., the display 120 in FIG. 1A) included in the housing and visible to the outside of the electronic device through the front surface, an optical sensor (e.g., the optical sensor 130 in FIG. 1A) located between the display and the rear surface overlapping at least one area of the display when viewed from above the front surface, the optical sensor including a light emitter and a light receiver, a first partition located between the light emitter and the light receiver based on the electronic device having a first shape, and a second partition present between the light emitter and the light receiver based on the electronic device having a second shape transformed from the first shape. A straight line interconnecting the light emitter and the light receiver may be perpendicular to a direction in which the electronic device is transformed from the first shape to the second shape.

The electronic device according to an example embodiment may further include a processor operatively connected to the optical sensor. The processor may be configured to: determine whether an object is approaching using the optical sensor in a state in which the display is activated; and perform a specified operation according to a determination result.

According to an example embodiment, the specified operation may include turning on/off of the display, turning on/off of an always-on-display (AoD) mode, or determining whether an erroneous touch is made.

According to an example embodiment, the first partition or the second partition may be located between the display and the optical sensor in a compressed state.

According to an example embodiment, the first partition or the second partition may be provided in a straight-line shape between the light emitter and the light receiver.

According to an example embodiment, the first partition or the second partition may be provided to surround the light receiver.

In the electronic device according to an example embodiment, the optical sensor may be mounted to be perpendicular to a movement path along which the first shape is transformed into the second shape.

In the electronic device according to an example embodiment, the first partition or the second partition may be mounted to be parallel to the movement path along which the first shape is transformed into the second shape.

According to an example embodiment, the first partition or the second partition may have an inclined shape.

According to an example embodiment, the first partition or the second partition may have a structure spaced apart from the optical sensor.

As described above, an electronic device (e.g., the electronic device 100 of FIG. 1A or the electronic device 300 of FIG. 1B) according to an example embodiment may include a first housing (e.g., the first housing 111 in FIG. 1A or the first housing 311 in FIG. 1B), a second housing (e.g., the second housing 112 in FIG. 1A or the second housing 312 in FIG. 1B) coupled to the first housing and configured to be movable with respect to the first housing, a flexible display (e.g., the display 120 in FIG. 1A) seated in the first housing and configured to be retracted into an inner space defined by the first housing and the second housing at a first edge of the first housing, wherein the flexible display includes glass defining the front surface of the electronic device, a pixel layer disposed under the glass and including a plurality of pixels, and a cover layer disposed under the pixel layer, a circuit board disposed under the flexible display, an optical sensor (e.g., the optical sensor 130 in FIG. 1A) disposed between the circuit board and the flexible display and including a light emitter and a light receiver, and at least one partition disposed between the optical sensor and the cover layer. Based on the flexible display having a first length in a direction perpendicular to the first edge, the optical sensor may be disposed to correspond to a first position of the flexible display, and based on the second housing moving with respect to the first housing and the flexible display has a second length greater than the first length in a direction perpendicular to the first edge, the optical sensor may be disposed to correspond to a second position of the flexible display. Based on the optical sensor being at the first position and based on the optical sensor being at the second position, the at least one partition may be disposed between the light emitter and the light receiver.

The electronic device according to an example embodiment may further include. A processor operatively connected to the optical sensor. The processor may be configured to: determine whether an object is approaching using the optical sensor in a state in which the display is activated; and perform a specified operation according to a determination result.

According to an example embodiment, the specified operation may include turning on/off of the display, turning on/off of an always-on-display (AoD) mode, or determining whether an erroneous touch is made.

According to an example embodiment, the at least one partition may be located between the flexible display and the optical sensor in a compressed state.

According to an example embodiment, the at least one partition may be provided in a straight-line shape between the light emitter and the light receiver.

According to an example embodiment, the at least one partition may be provided to surround the light receiver.

In the electronic device according to an example embodiment, the optical sensor may be mounted to be perpendicular to a path in which the flexible display moves from where the flexible display has a first length in the direction perpendicular to the first edge to where the flexible display has a second length greater than the first length in the direction perpendicular to the first edge.

In the electronic device according to an example embodiment, the at least one partition may be mounted to be parallel to a path in which the flexible display moves from where the flexible display has a first length in the direction perpendicular to the first edge to where the flexible display has a second length greater than the first length in the direction perpendicular to the first edge.

According to an example embodiment, the at least one partition may have an inclined shape.

According to an example embodiment, the at least one partition may have a structure spaced apart from the optical sensor.

In the above-described specific embodiments of the disclosure, components included in the disclosure have been expressed in singular or plural terms according to the presented specific embodiments. However, the singular or plural expressions are selected appropriately for the situation presented for convenience of description, and the disclosure is not limited to a singular element or plural elements. An element expressed in a plural form may be configured with a singular element, or an element expressed in a singular form may be configured with plural elements.

Meanwhile, in the detailed description, various example embodiments have been described, but various modifications are possible without departing from the scope of the disclosure. Therefore, the scope of the disclosure should not be limited to the described embodiments but should be determined not only based on the claims described below, but also based on equivalents to the claims. It will also be understood that any of the embodiment(s) described herein may be used in conjunction with any other embodiment(s) described herein.

What is claimed is:

1. An electronic device comprising:
 a housing comprising a front surface, a rear surface facing away from the front surface, and a side surface surrounding a space between the front surface and the rear surface;
 a display included in the housing and visible to outside of the electronic device through the front surface;
 an optical sensor located between the display and the rear surface overlapping at least one area of the display when viewed from above the front surface, the optical sensor comprising a light emitter and a light receiver;
 a first partition located between the light emitter and the light receiver based on the electronic device having a first shape; and
 a second partition present between the light emitter and the light receiver based on the electronic device having a second shape transformed from the first shape.

2. The electronic device of claim 1, further comprising a processor operatively connected to the optical sensor,
 wherein the processor is configured to: determine whether an object is approaching using the optical sensor in a state in which the display is activated; and perform a specified operation depending on a determination result.

3. The electronic device of claim 2, wherein the specified operation comprises turning on/off of the display, turning on/off of an always-on-display (AoD) mode, or determining whether an erroneous touch is made.

4. The electronic device of claim 1, wherein the first partition or the second partition is located between the display and the optical sensor in a compressed state.

5. The electronic device of claim 1, wherein the first partition or the second partition is provided in a straight-line shape between the light emitter and the light receiver.

6. The electronic device of claim 1, wherein the first partition or the second partition is provided to surround the light receiver.

7. The electronic device of claim 1, wherein the optical sensor is mounted to be perpendicular to a movement path along which the first shape is transformed into the second shape.

8. The electronic device of claim 1, wherein the first partition or the second partition is mounted to be parallel to the movement path along which the first shape is transformed into the second shape.

9. The electronic device of claim 1, wherein the first partition or the second partition has an inclined shape.

10. The electronic device of claim 1, wherein a straight line interconnecting the light emitter and the light receiver is perpendicular to a direction in which the electronic device is transformed from the first shape to the second shape.

11. An electronic device comprising:
 a first housing;
 a second housing movable with respect to the first housing;
 a flexible display disposed on the first housing and drawn into an inner space formed by the first housing and the second housing at a first edge of the first housing, wherein the flexible display including:
  a glass forming the front surface of the electronic device;
  a pixel layer disposed under the glass and including a plurality of pixels; and
  a cover layer disposed below the pixel layer;
 a circuit board disposed under the flexible display;
 an optical sensor disposed between the circuit board and the flexible display and including a light emitting unit and a light receiving unit; and
 at least one partition disposed between the optical sensor and the cover layer,
 wherein the optical sensor is disposed corresponding to a first position of the flexible display when the flexible display has a first length in a direction perpendicular to the first edge, wherein the optical sensor is disposed corresponding to a second position of the flexible display when the flexible display has a second length longer than the first length in a direction perpendicular to the first edge as the second housing moves relative to the first housing, and wherein the at least one partition is disposed between the light emitter and the light receiver when the optical sensor is in the first position and when the optical sensor is in the second position.

12. The electronic device of claim 11, further comprising a processor operatively connected to the optical sensor, wherein the processor is configured to: determine whether an object is approaching using the optical sensor in a state in which the display is activated; and perform a specified operation depending on a determination result.

13. The electronic device of claim 12, wherein the specified operation comprises turning on/off of the display, turning on/off of an always-on-display (AoD) mode, or determining whether an erroneous touch is made.

14. The electronic device of claim 11, wherein the at least one partition is located between the display and the optical sensor in a compressed state.

15. The electronic device of claim 11, wherein the at least one partition is provided in a straight-line shape between the light emitter and the light receiver.

16. The electronic device of claim 11, wherein at least one partition is provided to surround the light receiver.

17. The electronic device of claim 11, wherein the optical sensor is mounted to be perpendicular to a movement path moving from a state where the flexible display has the first length in a direction perpendicular to the first edge to a state where the flexible display has the second length longer than the first length in a direction perpendicular to the first edge.

18. The electronic device of claim 11, wherein the at least one partition is mounted to be parallel to a movement path moving from a state where the flexible display has the first length in a direction perpendicular to the first edge to a state where the flexible display has the second length longer than the first length in a direction perpendicular to the first edge.

19. The electronic device of claim 11, wherein the at least one partition has an inclined shape.

20. The electronic device of claim 11, wherein the at least one partition is spaced apart from the optical sensor.

* * * * *